(12) United States Patent
Umekida et al.

(10) Patent No.: US 8,998,731 B2
(45) Date of Patent: Apr. 7, 2015

(54) WHEEL BEARING DEVICE

(75) Inventors: Mitsuru Umekida, Iwata (JP); Masahiro Ozawa, Iwata (JP); Yuichi Asano, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/823,199

(22) PCT Filed: Aug. 18, 2011

(86) PCT No.: PCT/JP2011/068666
§ 371 (c)(1),
(2), (4) Date: Mar. 14, 2013

(87) PCT Pub. No.: WO2012/035925
PCT Pub. Date: Mar. 22, 2012

(65) Prior Publication Data
US 2013/0172088 A1     Jul. 4, 2013

(30) Foreign Application Priority Data
Sep. 17, 2010   (JP) .................................. 2010-209609

(51) Int. Cl.
*F16D 1/072*     (2006.01)
*F16D 3/24*     (2006.01)
(Continued)

(52) U.S. Cl.
CPC ................ *F16D 3/24* (2013.01); *F16D 1/0858* (2013.01); *F16D 3/223* (2013.01);
(Continued)

(58) Field of Classification Search
USPC ............ 464/178, 182, 906; 403/359.1–359.6; 384/542, 544, 589
See application file for complete search history.

(56) References Cited

U.S. PATENT DOCUMENTS 6,872,041 B2 * 3/2005 Lohr .............................. 411/378
8,556,737 B2 * 10/2013 Yamauchi et al. ............ 464/178
(Continued)

FOREIGN PATENT DOCUMENTS

CN     101061325     10/2007
CN     101617138     12/2009
(Continued)

OTHER PUBLICATIONS

"Dimensions of Metric Bolts." Schnotz, Wilhelm. Sep. 29, 2010, [online], [retrieved on Jun. 24, 2014]. Retrieved from the Internet <URL: https://web.archive.org/web/20110223080132/http://www.ehow.com/list_7189205_dimensions-metric-bolts.html>.*
(Continued)

Primary Examiner — Gregory Binda
Assistant Examiner — Josh Skroupa
(74) Attorney, Agent, or Firm — Wenderoth, Lind & Ponack, L.L.P.

(57) ABSTRACT

A shaft portion of a joint outer ring where projections extending in an axial direction are provided is press-fitted into a hole portion of a hub wheel to thereby form recesses by the projections in an inner diameter surface of a shaft fitting hole of the hub wheel, by which a recess-projection fitting structure is constructed. An entire area of fitting sites of the projections and the recesses are brought into close contact. Moreover, a bolt member is fastened in a bolt hole provided in the shaft portion of the joint outer ring after the construction of the recess-projection fitting structure, which restricts separation between the hub wheel and the joint outer ring. As the bolt member, if an outer diameter of a seating surface thereof is d1 and a shaft diameter is d2, a bolt member satisfying a relational expression of $2.3 \leq (d1/d2)^2 \leq 4.9$ is used.

12 Claims, 14 Drawing Sheets

(51) Int. Cl.
- *F16D 1/08* (2006.01)
- *F16D 3/223* (2011.01)
- *F16C 35/063* (2006.01)
- *F16C 33/76* (2006.01)
- *B60B 27/00* (2006.01)
- *F16C 19/18* (2006.01)

(52) U.S. Cl.
CPC .. *F16D 2003/22326* (2013.01); *F16C 35/0635* (2013.01); *F16C 19/186* (2013.01); *F16C 33/768* (2013.01); *F16C 2326/02* (2013.01); *B60B 27/0026* (2013.01); *B60B 27/0042* (2013.01); *B60B 2900/115* (2013.01); *B60Y 2200/11* (2013.01)

(56) References Cited

U.S. PATENT DOCUMENTS

| | | | |
|---|---|---|---|
| 2008/0012421 | A1 | 1/2008 | Shige et al. |
| 2010/0220946 | A1 | 9/2010 | Ozawa et al. |
| 2010/0226604 | A1 | 9/2010 | Nakagawa et al. |
| 2011/0170980 | A1* | 7/2011 | McGrade ............ 411/338 |

FOREIGN PATENT DOCUMENTS

| | | | |
|---|---|---|---|
| JP | 2004-340311 | 12/2004 | |
| JP | 2009-056869 | 3/2009 | |
| JP | 2009-90969 | 4/2009 | |
| JP | 2009-120186 | 6/2009 | |
| JP | 2009-270627 | 11/2009 | |
| JP | 2010-116144 | 5/2010 | |
| JP | 2010-158957 | 7/2010 | |
| JP | 2010-163051 | 7/2010 | |
| WO | 2009/051047 | 4/2009 | |
| WO | WO 2009123254 A1 * | 10/2009 | ............ B60B 35/14 |
| WO | 2010/044344 | 4/2010 | |

OTHER PUBLICATIONS

International Search Report issued Nov. 22, 2011 in International (PCT) Application No. PCT/JP2011/068666.

International Preliminary Report on Patentability and Written Opinion of the International Searching Authority issued Apr. 25, 2013 in International (PCT) Application No. PCT/JP2011/068666.

Chinese Office Action issued Dec. 29, 2014 in corresponding Chinese Application No. 201180051298.3 with English translation.

* cited by examiner

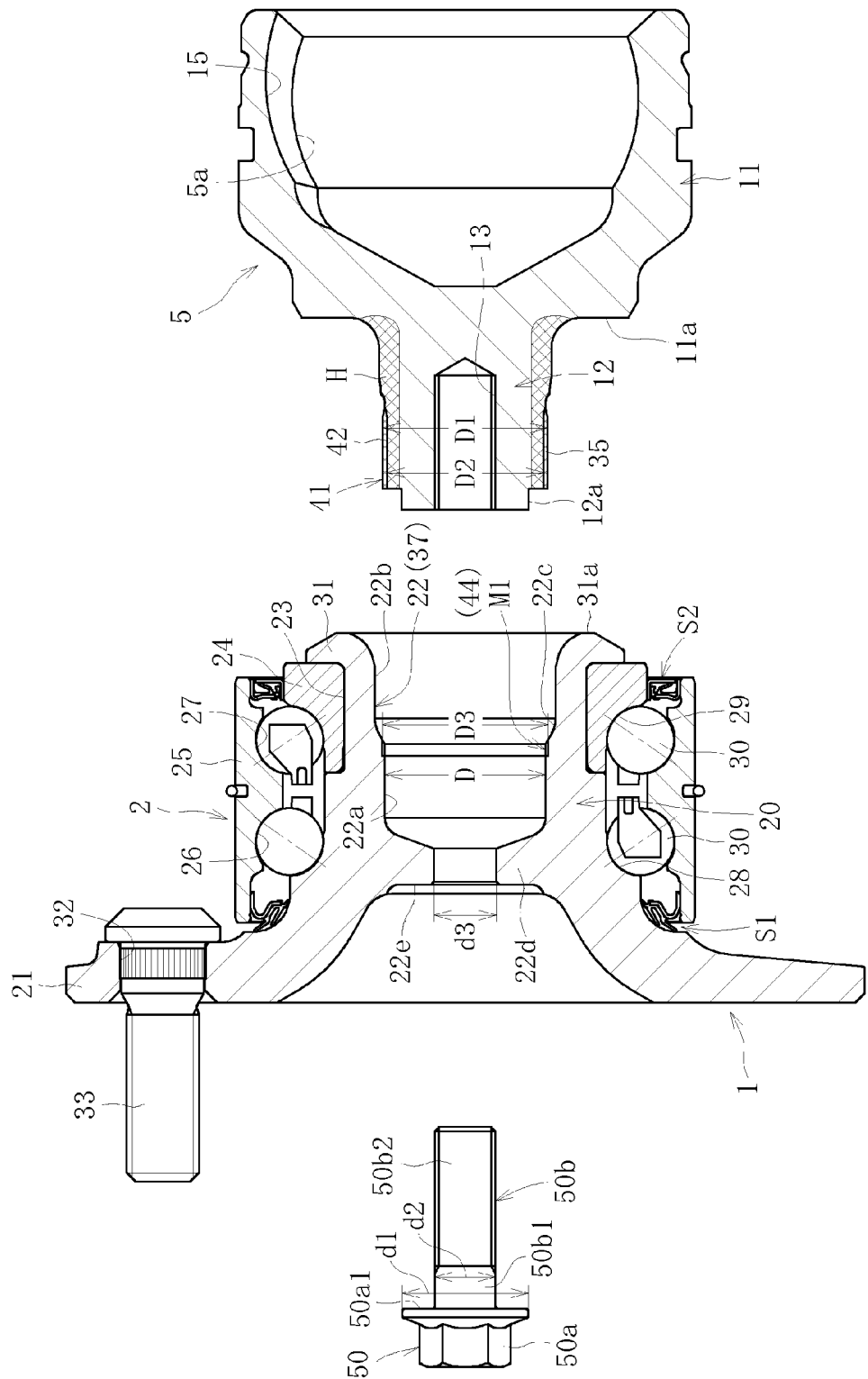

WHEEL BEARING DEVICE

TECHNICAL FIELD

The present invention relates to a wheel bearing device to support a wheel rotatably with respect to a vehicle body in a vehicle such as an automobile and the like.

BACKGROUND ART

A wheel bearing device has been evolved from a structure referred to as a first generation in which a double-row rolling bearing are used in combination to a second generation in which a vehicle body mounting flange is integrally provided in an outer member, and has been further developed to a third generation in which one of two inner raceway surfaces of the double-row rolling bearing is formed in an outer circumference of a hub wheel having the wheel mounting flange, and further, to a fourth generation in which one of the two inner raceway surfaces of the double-row rolling bearing is formed in the outer circumference of the hub wheel, and the other is formed in an outer circumference of an outer joint member of a constant velocity universal joint.

For example, in Patent Literature 1, one example of the wheel bearing device referred to as the third generation is described. As shown in FIG. 15, this wheel bearing device includes a hub wheel 152 having a flange 151 extending in an outer diameter direction, a constant velocity universal joint 154 in which an outer joint member 153 thereof is fixed to this hub wheel 152, and an outer member 155 disposed on an outer circumferential side of the hub wheel 152.

The constant velocity universal joint 154 includes the outer joint member 153, an inner joint member 158 disposed inside a mouse portion 157 of this outer joint member 153, a ball 159 disposed between this inner joint member 158 and the outer joint member 153, and a holder 160 that holds the ball 159. Moreover, female splines 161 are formed in an inner circumferential surface of a central hole of the inner joint member 158, and male splines formed at an end portion of a shaft not shown are inserted into this central hole. The female splines 161 of the inner joint member 158 and the male splines of the shaft are fitted, by which the inner joint member 158 and the shaft are coupled so as to be able to transmit a torque.

The hub wheel 152 has a cylindrical portion 163 and the flange 151, and in an outer end surface 164 (an end surface on an outboard side) of the flange 151, there is projected a short-cylindrical pilot portion 165 to attach a wheel and a brake rotor, which are not shown. The pilot portion 165 is made up of a large-diameter portion 165a and a small-diameter portion 165b, the brake rotor is externally fitted on the large-diameter portion 165a, and the wheel is externally fitted on the small-diameter portion 165b.

A fitting portion 166 is provided in an outer circumferential surface of an end portion on an inboard side of the cylindrical portion 163, and an inner ring 167 of a rolling bearing is fitted on this fitting portion 166. A first inner raceway surface 168 is provided in the vicinity of the flange 151 in an outer circumferential surface of the cylindrical portion 163, and a second inner raceway surface 169 is provided in an outer circumferential surface of the inner ring 167. Moreover, a bolt attachment hole 162 is provided in the flange 151 of the hub wheel 152, and a hub bolt to fix the wheel and the brake rotor to the flange 151 is fitted into the bolt attachment hole 162.

The outer member 155 of the rolling bearing has double-row outer raceway surfaces 170, 171 in an inner circumference thereof, and a flange (a vehicle body mounting flange) 182 in an outer circumference thereof. The first outer raceway surface 170 and the second outer raceway surface 171 of the outer member 155 are opposed to the first inner raceway surface 168 of the hub wheel 152, and the second inner raceway surface 169 of the inner ring 167, respectively, and rolling elements 172 are interposed between these raceway surfaces.

A shaft portion 173 of the outer joint member 153 is inserted into the cylindrical portion 163 of the hub wheel 152. At a shaft end portion of the shaft portion 173, a screw portion 174 is formed, and male splines 175 are formed in an outer diameter portion on the inboard side from this screw portion 174. Moreover, female splines 176 are formed in an inner diameter surface of the cylindrical portion 163 of the hub wheel 152, and press-fitting the shaft portion 173 into the cylindrical 163 of the hub wheel 152 allows the male splines 175 on the side of the shaft portion 173 and the female splines 176 on the side of the hub wheel 152 to be fitted.

A nut member 177 is screwed and attached onto the screw portion 174 of the shaft portion 173, thereby fixing the hub wheel 152 and the outer joint member 153. At this time, a seating surface 178 of the nut member 177 and an outer end surface 179 of the cylindrical portion 163 abut, and an end surface 180 on the outboard side of the mouse portion 157 and an end surface 181 of the inner ring 167 of the rolling bearing abut. This allows the hub wheel 152 to be sandwiched between the nut member 177 and the mouse portion 157 with the inner ring 167 interposed.

PRIOR ART DOCUMENT

Patent Document

Patent Document 1: JP 2004-340311 A
Patent Document 2: JP 2009-56869 A

SUMMARY OF THE INVENTION

Problems to be Solved by the Invention

Conventionally, as described before, the outer joint member 153 and the hub wheel 152 are coupled by press-fitting the male splines 175 provided in the shaft portion 173 into the female splines 176 provided in the hub wheel 152. Thus, both the shaft portion 173 and the hub wheel 152 need to be subjected to spline machining, thereby resulting in an increase in cost. At the time of press fitting, the recesses and projections need to be matched between the male splines 175 of the shaft portion 173 and the female splines 176 of the hub wheel 152. At this time, if press fitting by tooth-surface fitting is performed, there is a possibility of damage in a tooth surface by peeling or the like. Moreover, if the press fitting by large-diameter fitting is performed, rattle in a circumferential direction is easily caused. The rattle in the circumferential direction causes possibilities of deterioration in transmissibility of rotary torque and occurrence of abnormal noise. In this manner, when the hub wheel 152 and the shaft portion 173 are coupled by the spline fitting, there are problems of the damage in the tooth surface at the time of press fitting, and the occurrence of the rattle in use, and it is difficult to avoid both at the same time.

When repair of the wheel bearing device is performed, there is a possibility that the repair is difficult in a state where the hub wheel and the outer joint member are coupled. Thus, in order to enable the bearing portion and the joint portion to be subjected to the repair individually, it is desired that the hub wheel and the outer joint member can be separated, and it is necessary that after separation, both can be recoupled (reassembled).

In light of the foregoing, the applicant of the present application has proposed the wheel bearing device disclosed in Patent Literature 2. Particularly, projections extending in an axial direction provided in one of the shaft portion of the outer joint member and the hole portion of the hub wheel are press-fitted into the other, by which recesses are formed in the other, thereby constructing a recess-projection fitting structure, in which an entire area of fitting sites of the projections and the recesses is in close contact. Since at the time of construction of this recess-projection fitting structure, a spline portion need not be beforehand formed in the other, productivity can be increased. Moreover, since the damage in the tooth surface can be avoided, a stable fitting state can be maintained. Furthermore, since in the recess-projection fitting structure, a gap where rattle occurs is not formed in a radial direction and in a circumferential direction, stable torque transmission is enabled, and the occurrence of abnormal noise can be prevented. In addition, since the shaft portion comes into close contact with the hole portion without any gap, and strength of a torque transmitting site is thus increased, a length of the fitting portion can be shortened, thereby making the bearing device compact in the axial direction.

Furthermore, since the above-described recess-projection fitting structure can be separated by applying a drawing force in the axial direction in a state where the bolt member is removed from the bolt hole provided in the shaft portion, favorable repair workability (maintainability) can be assured. Moreover, after repair, press-fitting the shaft portion of the outer joint member into the hole portion of the hub wheel allows the recess-projection fitting structure to be reconstructed. The reconstruction of the recess-projection fitting structure (recoupling of the hub wheel and the outer joint member) is enabled by screwing the bolt member into the bolt hole provided in the shaft portion. Thus, at the time of reconstruction of the recess-projection fitting structure, large-scale equipment such as a pressing machine for press fitting and the like is not required. Accordingly, in a field site such as a car repair factory and the like, inspection, repair and the like of the wheel bearing device can be easily performed.

However, in the wheel bearing device described in Patent Literature 2 as well, there is room for improvement. For instance, with the bolt member used in fastening and recoupling of the hub wheel and the outer joint member, if sizes of respective portions making up this bolt member are inadequate, troubles are caused, that assemblability of the bearing device is decreased, that improper stress concentration occurs in the respective portions of the bearing device, thereby adversely affecting the torque transmissibility and durability life, and so on. Nevertheless, in Patent Literature 2, in order to assure an insertion property of the bolt member with respect to the hub wheel, only dimensional relationships between a hole diameter of the hole portion of the hub wheel and a shaft diameter of the bolt member are mentioned.

The present invention is devised in light of the above-described current condition, and an object thereof is to optimize a bolt member used in this type of wheel bearing device to thereby enhance assemblability and enable predetermined torque transmissibility to be stably maintained over a long period of time.

Solutions to the Problems

A wheel bearing device according to the present invention devised in order to achieve the above-described objection is a wheel bearing device including an outer member having double-row raceway surfaces in an inner circumference, an inner member including a hub wheel mounted on a wheel and having double-row raceway surfaces which opposed to the raceway surfaces of the outer member in an outer circumference, and double-row rolling elements intervening between the raceway surfaces of the outer member and the inner member, and a constant velocity universal joint having an outer joint member, in which projections extending in an axial direction and provided in any one of a shaft portion of the outer joint member and a hole portion of the hub wheel are press-fitted into the other to form recesses by the projections in the other, by which a recess-projection fitting structure where an entire area of fitting sites of the projections and the recesses is brought into close contact is constructed, and a bolt hole is provided in the shaft portion of the outer joint member, and a bolt member screwed into the bolt hole fastens the hub wheel and the outer joint member, while applying a drawing force in the axial direction in a state where the bolt member is detached permits separation of the recess-projection fitting structure, wherein as the bolt member, if a seating surface outer diameter thereof is d1 and a shaft diameter thereof is d2, the bolt member satisfying a relational expression of $2.3 \leq (d1/d2)^2 \leq 4.9$ is used.

In the recess-projection fitting structure in the present invention, while the entire area of the fitting sites of the projections and the recesses is brought into contact, a gap may exist in only a very small partial area of each of the fitting sites. Since the above-described gap is inevitably caused in a formation process of the recesses by the projections, even the existence of the gap is included in the concept "the entire area of the fitting sites of the projections and recesses are brought into close contact".

As described above, in the wheel bearing device according to the present invention, as the bolt member, if the seating surface outer diameter thereof is d1, and the shaft diameter thereof is d2, the bolt member satisfying the relational expression of $2.3 \leq (d1/d2)^2 \leq 4.9$ is used. While in order to make a value of $(d1/d2)^2$ smaller, the seating surface outer diameter d1 is made smaller, or the shaft diameter d2 is made larger, if the seating surface outer diameter d1 is made too small, there is a possibility that abrasion or indentation is easily caused in an area of an end surface of the hub wheel opposed to a seating surface of the bolt member in the axial direction, and if the shaft diameter d2 is made large, there is a possibility that a bolt axial force becomes excessive. For example, in the case where a structure is employed in which the end surface of the hub wheel and an end surface of the outer joint member, which are opposed to each other, are brought into contact, when the bolt axial force becomes too large, a contact surface pressure between both becomes higher, and when both rotate relatively or the like, abnormal noise (stick-slip sound) is easily caused. While it is considered that these problems can be solved by making the value of $(d1/d2)^2$ larger, in order to make the value of $(d1/d2)^2$ larger, the seating surface outer diameter d1 needs to be made larger, or the shaft diameter d2 needs to be made smaller. However, making the seating surface outer diameter d1 too large causes limitation in shape of the hub wheel that receives a head portion, so that troubles are posed, such as a decrease in design freedom degree of the hub wheel, a deterioration in assemblability, difficulty with fastening torque management of the bolt member, and so on. If the shaft diameter d2 is made small, the bolt axial force is decreased. Accordingly, in light of the above-described situations, as the bolt member, the bolt member satisfying the relational expression of $2.3 \leq (d1/d2)^2 \leq 4.9$ is desirably used. This can solve the above-described various problems and in addition, a decrease in fastening force due to bolt loosening, or intrusion of muddy water to the recess-projection fitting structure attributed to this can be prevented as much as possible.

When the projections are provided in the shaft portion of the outer joint member, hardness of at least an end portion on a press fitting start side of these projections is made higher than that of a hole portion inner diameter portion of the hub wheel. This can enhance rigidity of the shaft portion, and a digging property of the projections into the hole portion inner diameter portion of the hub wheel is increased.

In this case, a pocket portion that stores a sticking-out portion produced by the formation of the recesses by the press fitting of the projections can be provided in the shaft portion of the outer joint member. Here, the sticking-out portion is produced from a material of an amount equivalent to a volume of the recesses, and is made of the material pushed out from the formed recesses, from the material cut out to form the recesses, or from both the pushed-out material and the cut-out material, or the like. Provision of the pocket portion enables the sticking-out portion to be stored in the pocket portion, and a situation where the sticking-out portion enters a vehicle inside outside the device can be prevented. Moreover, in this case, the sticking-out portion can be left stored in the pocket portion, which makes it unnecessary to separately perform a removal process of the sticking-out portion. Thus, assembling work man-hours can be decreased, which can achieve enhancement of assembling workability and cost reduction.

In the case where the projections are provided in the inner diameter surface of the hole portion of the hub wheel, hardness of at least the end portion on the press fitting start side of these projections is desirably made higher than that of an outer diameter portion of the shaft portion of the outer joint member. In this case, since thermal hardening treatment of the shaft portion side need not be performed, productivity of the outer joint member can be increased. Moreover, in this case, the above-described pocket portion is formed in the hole portion of the hub wheel.

When the projections are provided at a plurality of positions in a circumferential direction, in an intermediate portion in a height direction of each of the projections, a thickness in the circumferential direction of the projection is desirably made smaller than a groove width between the adjacent projections. In this case, since a thickness in the circumferential direction of the counterpart side digging into the groove between the adjacent projections is larger, a shear area of the counterpart can be made larger, which can increase twist strength. In addition, since the tooth thickness of the projection is smaller, a press fitting load can be made smaller, and a press-fitting property (forming property of the recess-projection fitting) can be enhanced. In the intermediate portion in the height direction of the projections, a summation of thicknesses in the circumferential direction of the respective projections is made smaller than a summation of the groove widths between the adjacent projections, by which a similar effect can be obtained.

The inner member can be made up of the hub wheel and an inner ring press-fitted in an outer circumference of an end portion on an inboard side of the hub wheel, and in this case, the raceway surfaces can be formed in an outer circumference of the hub wheel and an outer circumference of the inner ring, respectively. This can make the wheel bearing device lightweight and compact. Furthermore, the end portion of the hub wheel is caulked to thereby precompress the bearing, which makes it unnecessary to precompress the bearing by the outer joint member. This enables the shaft portion of the outer joint member to be press-fitted without considering the precompression of the bearing, which can enhance a joining property (assemblability) between the hub wheel and the outer joint member.

Bringing an end surface of the hub wheel and an end surface of the outer joint member, which are opposed to each other, into contact enhances bending rigidity in the axial direction, which brings about a high-quality, durable product. Moreover, when press-fitting the projections (when forming the recess-projection fitting structure), relative positioning in the axial direction between the hub wheel and the outer joint member is enabled. Thereby, dimension accuracy of the bearing device can be stabilized, and a length in the axial direction of the recess-projection fitting structure can be stabilized, which can enhance the torque transmissibility. In addition, the intrusion of foreign matters to the recess-projection fitting structure can be prevented without providing any separate seal structure, and a stable fitting state can be maintained at low cost over a long period of time. However, if a contact surface pressure of both is too high, there is a possibility that the torque transmission is performed even in the precompressed contact surface, which allows a larger torque to be loaded, and when the contact surfaces become disabled to cope with the torque transmission, the contact surfaces rapidly slip, and abnormal noise occurs. Thus, both are desirably brought into contact with a surface pressure of 100 MPa or less. In view of surely preventing the occurrence of abnormal noise, it is effective to bring the end surface of the hub wheel and the end surface of the outer joint member, which are opposed to each other, into non-contact. In this case, a seal member desirably intervenes in a gap formed between both to prevent the intrusion of foreign matters to the recess-depression fitting structure.

When in the above-described constitution, a guide portion to guide the press fitting of the projections (to match a phase between the projections and the recesses formed by the projections) is provided at the end portion on the press fitting start side of the member where the recesses are formed, the projections can be press-fitted along the guide portion, thereby enhancing the press fitting accuracy of the projections. This prevents a situation where the projections are press-fitted in an axial misalignment state or in an inclined state as much as possible, and construction and reconstruction of the high-accuracy recess-projection fitting structure are enabled.

A seal material can intervene between the seating surface of the bolt member and the hub wheel. This can increase the effect of preventing the intrusion of rain water and foreign matters to the recess-projection fitting structure through the bolt fastening portion. This can further stabilize the fitting state and further enhance the quality.

Effects of the Invention

As described above, according to the present invention, in this type of wheel bearing device, various troubles that may be caused attributed to improper sizes of the respective portions of the bolt member can be prevented as much as possible, which enhances the assemblability, and enables the predetermined torque transmissibility to be stably maintained over a long period of time.

BRIEF DESCRIPTION OF THE DRAWINGS

FIG. 2b is an enlarged view of an X portion in FIG. 2a.

FIG. 4 is a cross-sectional view showing a state before assembling the wheel bearing device shown in FIG. 1.

FIG. 5b is a view showing a modification of FIG. 5a.

FIG. 5c is a view showing a modification of FIG. 5a.

FIG. 8b is a view showing a modification of FIG. 8a.

FIG. 11b is a cross-sectional view showing a modification of FIG. 11a.

FIG. 13b is an enlarged view of a Y portion in FIG. 13a.

FIG. 14 is an enlarged view of the recess-projection fitting structure shown in FIG. 13a.

EMBODIMENTS OF THE INVENTION

Hereinafter, embodiments of the present invention will be described, based on FIGS. 1 to 14.

Figure 1:
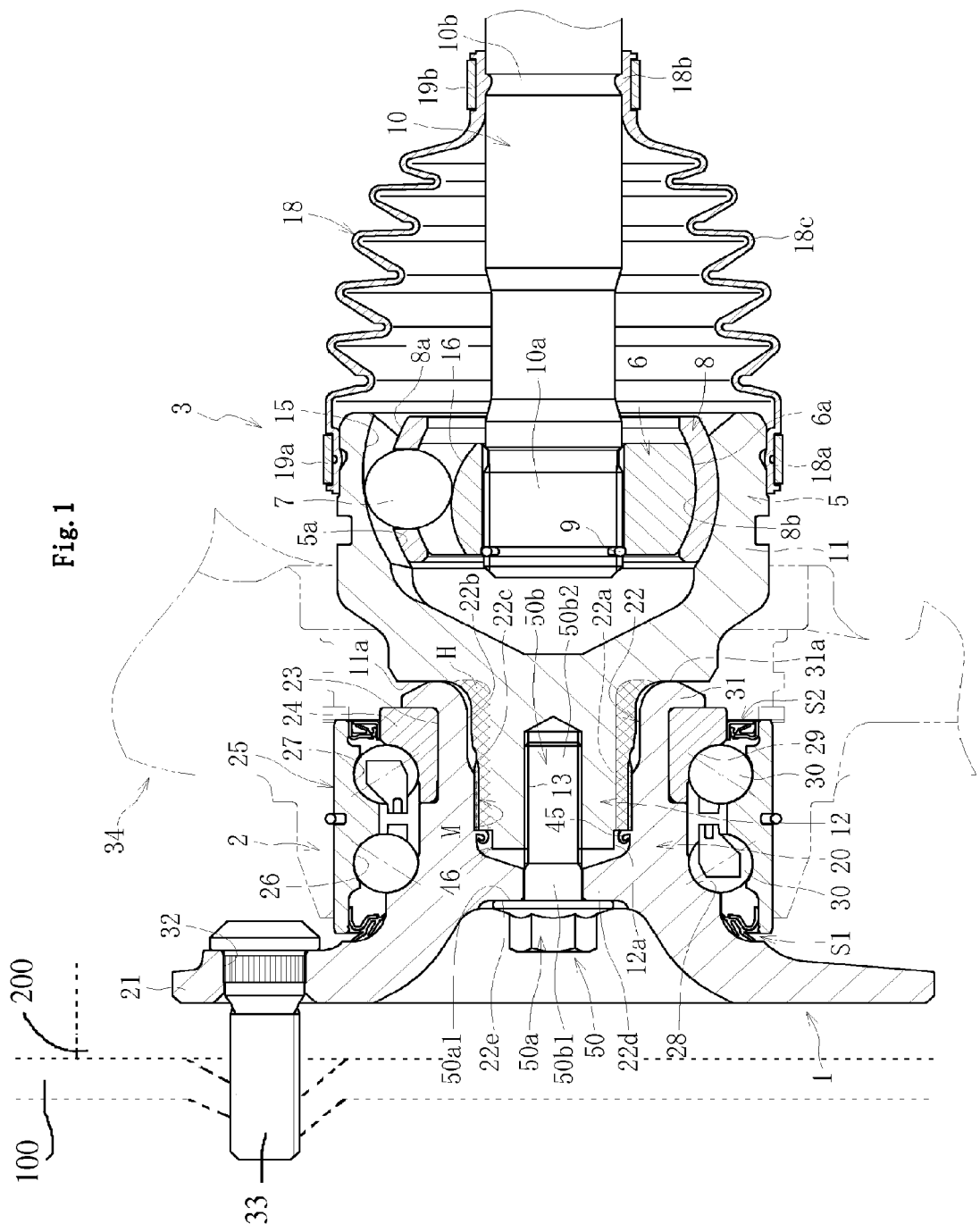
FIG. 1 is a cross-sectional view showing a wheel bearing device according to a first embodiment of the present invention.

FIG. 1 is a cross-sectional view showing a wheel bearing device according to a first embodiment of the present invention. In the wheel bearing device shown in the same figure, a major portion is made up by integrating a double-row wheel bearing 2 including a hub wheel 1, and a constant velocity universal joint 3. In the following description, an inboard side and an outboard side mean an inner side and an outer side in a vehicle wide direction of a vehicle in a state where the wheel bearing device is mounted on the vehicle, respectively. In FIG. 1, the right side is the inboard side and the left side is the outboard side.

The constant velocity universal joint 3 is made up of, as major members, a joint outer ring 5 as an outer joint member, a joint inner ring 6 as an inner joint member disposed on an inner diameter side of the joint outer ring 5, a plurality of balls 7 (rolling elements) intervening between the joint outer ring 5 and the joint inner ring 6, and a cage 8 that intervenes between the joint outer ring 5 and the joint inner ring 6 to hold the balls 7. An end portion 10a of a shaft 10 is press-fitted into a hole portion inner diameter of the joint inner ring 6, by which the shaft 10 is spline-fitted into the joint inner ring 6, so that the torque transmission is enabled between both. A stopper ring 9 is fitted in the end portion 10a of the shaft 10, which prevents the shaft 10 from coming off from the joint inner ring 6.

The joint outer ring 5 includes a mouse portion 11 and a shaft portion 12. The mouse portion 11 has a bowl shape with one end open, and is formed with a plurality of track grooves 15 extending in an axial direction in an inner spherical surface 5a at even intervals in a circumferential direction. The track grooves 15 extend to an opening end of the mouse portion 11. The opening portion of the mouse portion 11 is closed by a boot 18. The boot 18 is made up of a large-diameter portion 18a, a small-diameter portion 18b, and a bellows portion 18c joining the large-diameter portion 18a and the small-diameter portion 18b. The large-diameter portion 18a is fastened to the joint outer ring 5 by a boot band 19a in a state externally fitted onto the opening portion of the mouse portion 11. On the other hand, the small-diameter portion 18b is fastened to the shaft 10 by a boot band 19b in a state externally fitted on a boot attachment portion 10b of the shaft 10.

At a forefront portion (an end portion on the outboard side) of the shaft portion 12, a small-diameter portion 12a whose outer diameter dimension is small as compared with other portions is provided, and a bolt hole 13 opening in a forefront surface is provided on an axial center of the forefront portion of the shaft portion 12. A bolt member 50 is screwed and attached into the bolt hole 13, by which the shaft portion 12 of the joint outer ring 5 is bolt-fixed to the hub wheel 1. The bolt member 50 is made up of a head portion 50a having a flange, and a screw shaft portion 50b. The screw shaft portion 50b has a cylindrical plane-shaped base portion 50b1 and a screw portion 50b2 screwed and attached into the bolt hole 13.

In the joint inner ring 6, a plurality of track grooves 16 extending in the axial direction are formed at even intervals in the circumferential direction in an outer spherical surface 6a.

The track grooves 15 of the joint outer ring 5 and the track grooves 16 of the joint inner ring 6 make pairs, and the balls 7 as torque transmission elements are rotatably incorporated one by one in ball tracks each made up of the pair of the track grooves 15, 16. The balls 7 intervene between the track grooves 15 of the joint outer ring 5 and the track grooves 16 of the joint inner ring 6 to transmit the torque. The cage 8 slidably intervenes between the joint outer ring 5 and the joint inner ring 6, and is fitted in the inner spherical surface 5a of the joint outer ring 5 at an outer spherical surface 8a, and fitted on the outer spherical surface 6a of the joint inner ring 6 at an inner spherical surface 8b. While the constant velocity universal joint 3 used in this embodiment is of a so-called Rzeppa type in which the respective track grooves 15, 16 are each formed into a curved surface, any other publicly-known constant velocity universal joint such as a so-called undercut free type, in which the outer ring track grooves 15 are linear on the opening side of the mouse portion 11 and the inner ring track grooves 16 are linear on the back portion side of the mouse portion 11, and the like can be used.

Figure 15:
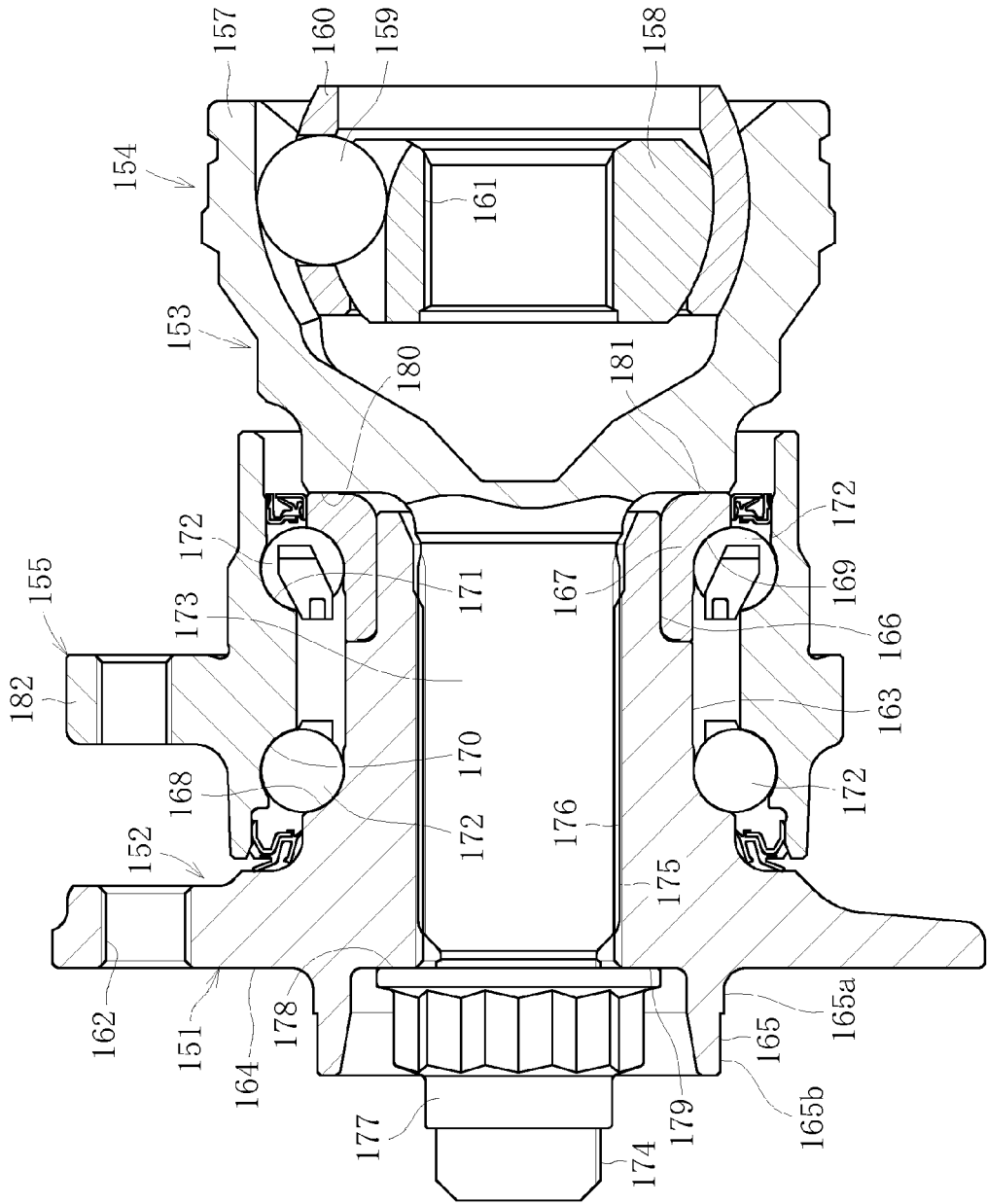
FIG. 15 is a cross-sectional view showing a conventional wheel bearing device.

The hub wheel 1 has a cylindrical portion 20, and a flange 21 provided at an end portion on the outboard side of the cylindrical portion 20. The flange 21 functions as a mounting portion to mount the hub wheel 1 on a wheel, and has a bolt attachment hole 32. A hub bolt 33 is attached in the bolt attachment hole 32, and the hub bolt 33 fixes a wheel 100 and a brake rotor 200 to the flange 21. In the hub wheel 1 of the present embodiment, the pilot portion 165 (refer to FIG. 15) provided in the hub wheel of the conventional wheel bearing device is not provided.

A hole portion 22 is provided in the cylindrical portion 20 of the hub wheel 1. The hole portion 22 includes a shaft portion fitting hole 22a located in a substantially intermediate portion in the axial direction of the hub wheel 1 (the cylindrical portion 20), and a large-diameter hole 22b located on the inboard side from the shaft portion fitting hole 22a. A taper portion (taper hole) 22c whose diameter is gradually reduced toward the outboard side is provided between the shaft fitting hole 22a and the large-diameter hole 22b. A taper angle (an inclination angle to an axial line) of the taper portion 22c is, for example, 15° to 75°. In the shaft portion fitting hole 22a, the shaft portion 12 of the joint outer ring 5 and the hub wheel 1 are coupled through a recess-projection fitting structure M described later.

In the cylindrical portion 20, on the outboard side from the shaft portion fitting hole 22a, a cylindrical inner wall 22d protruded in an inner diameter direction is provided. This inner wall 22d functions as a reception portion that receives the head portion 50a of the bolt member 50, and the screw shaft portion 50b of the bolt member 50 is inserted into an inner circumference of the inner wall 22d. When the screw portion 50b2 of the screw shaft portion 50b is screwed and attached into the bolt hole 13 provided in the shaft portion 12, an inner circumferential surface of the inner wall 22d is opposed to a cylindrical outer circumferential surface of the base portion 50b1 of the screw shaft portion 50b. An inner diameter dimension d3 of the inner wall 22d is set to be slightly larger than a shaft diameter d2 of the bolt member 50 (the screw shaft portion 50b) (refer to FIG. 8). Specifically, 0.05 mm<d3−d2<0.5 mm is satisfied. A depressed portion 22e is provided in a central portion of an end surface on the outboard side of the hub wheel 1, and a seating surface 50a1 of the bolt member 50 abuts on a bottom surface of this depressed portion 22e.

In an outer circumferential surface on the inboard side of the hub wheel 1, a stepped portion 23 having a small diameter is formed, and an inner ring 24 is fitted onto this stepped portion 23, by which an inner member having double-row inner raceway surfaces 28, 29 is constructed. Of the double-row inner raceway surfaces, the inner raceway surface 28 on the outboard side is formed in the outer circumferential surface of the hub wheel 1, and the inner raceway surface 29 on the inboard side is formed in an outer circumferential surface of the inner ring 24. A major portion of the wheel bearing 2 is made up of this inner member, a cylindrical outer member 25 arranged on an outer diameter side of the inner member, and having double-row outer raceway surfaces 26, 27 in an inner circumference, and balls as rolling elements 30 arranged between the outer raceway surface 26 on the outboard side of the outer member 25 and the inner raceway surface 28 of the hub wheel 1, and between the outer raceway surface 27 on the inboard side of the outer member 25 and the inner raceway surface 29 of the inner ring 24. The outer member 25 is mounted on a knuckle 34 extending from a suspension device of a vehicle body not shown. In opening portions at both ends of this wheel bearing 2 (the outer member 25), seal members S1, S2 are provided, thereby preventing external leakage of a lubricant such as grease enclosed inside the bearing 2 and the like or intrusion of foreign matters into the bearing. In this manner, since the hub wheel 1 and the inner ring 24 fitted onto the stepped portion 23 of the hub wheel 1 make up the inner member having the inner raceway surfaces 28, 29, the wheel bearing device can be made lightweight and compact.

This wheel bearing 2 has a structure in which the inner ring 24 is pressed to the outboard side by a caulking portion 31 formed by caulking the end portion on the inboard side of the cylindrical portion 20 of the hub wheel 1 to thereby fix the inner ring 24 to the hub wheel 1, and precompress an bearing inside. In this manner, when the wheel bearing 2 is precompressed by the caulking portion 31 formed at the end portion of the hub wheel 1, the wheel bearing 2 need not be precompressed by the mouse portion 11 of the joint outer ring 5. Accordingly, the shaft portion 12 of the joint outer ring 5 can be assembled to the hub wheel 1 without considering an amount of precompression, so that the assemblability of the hub wheel 1 and the joint outer ring 5 can be enhanced.

The end portion on the inboard side of the hub wheel 1 abuts on an end portion on the outboard side of the mouse portion 11 of the joint outer ring 5. That is, an end surface 31a of the caulking portion 31 of the hub wheel 1 and a back surface 11a of the mouse portion 11 of the joint outer ring 5 are opposed to each other and are in a contact state.

Figure 2A:
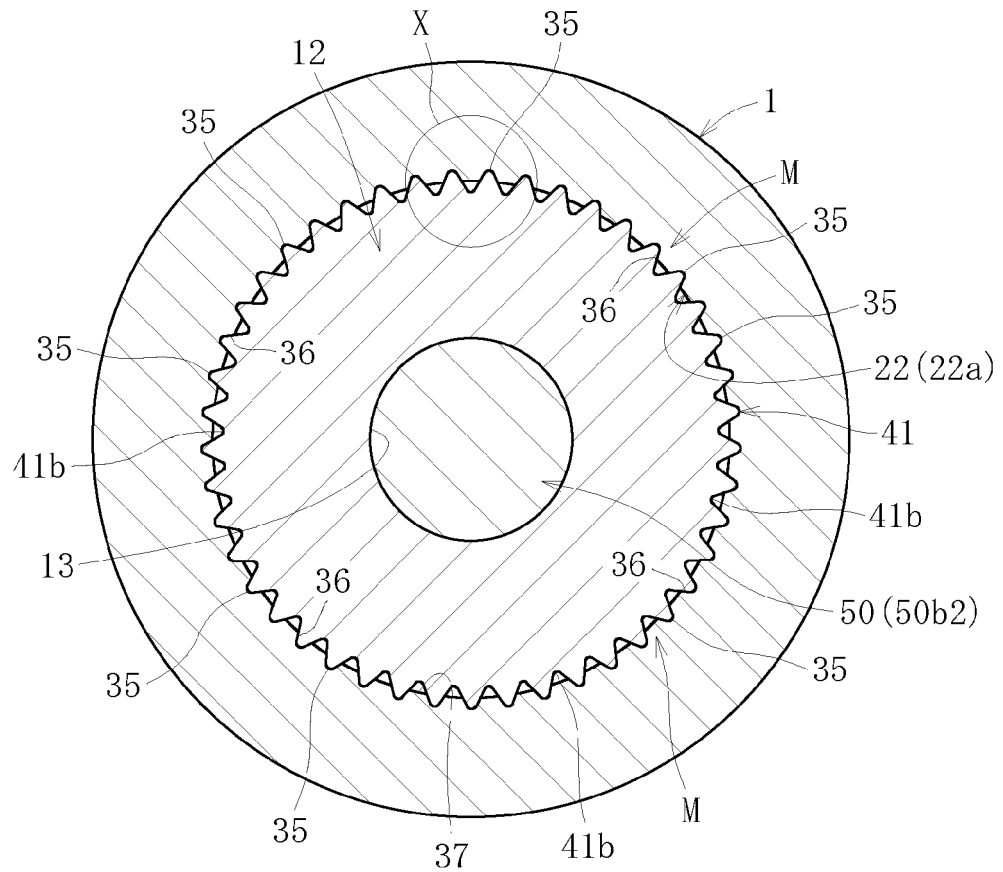
FIG. 2a is a cross-sectional view perpendicular to an axis in a recess-projection fitting structure site formed in the wheel bearing device shown in FIG. 1.
Figure 2B:
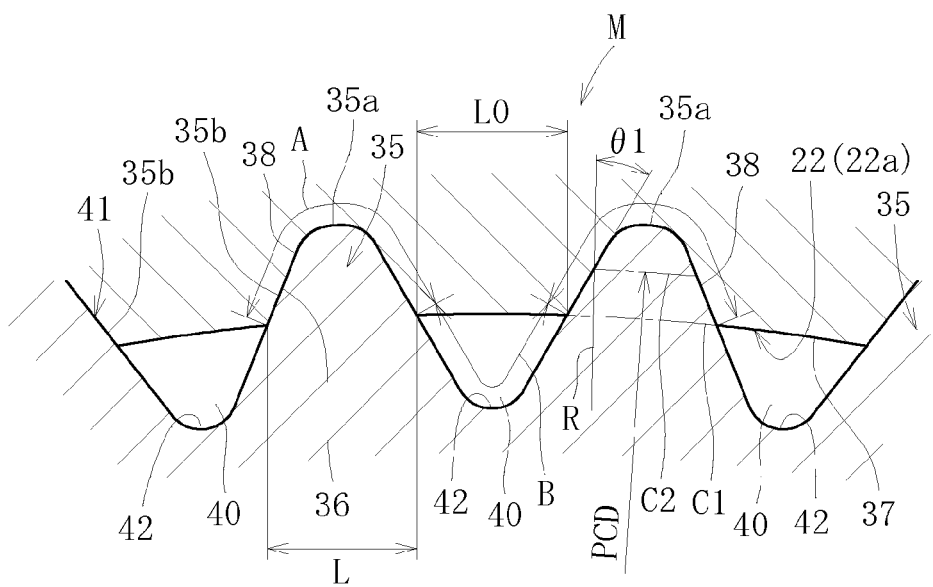

As shown in FIGS. 2a and 2b, the recess-projection fitting structure M is made up of, for example, projections 35 extending in the axial direction provided in an end portion on the outboard side of the shaft portion 12, and recesses 36 formed in an inner diameter surface 37 of the shaft portion fitting hole 22a in the hole portion 22 of the hub wheel 1. An entire area of fitting sites 38 of the projections 35 and the recesses 36 of the hub wheel 1 fitted to the projections 35 is in a close contact state. Male splines 41 are formed in an outer circumferential surface of the end portion on the outboard side of the shaft portion 12, by which the plurality of projections 35 extending in the axial direction are disposed at predetermined intervals along the circumferential direction, the plurality of recesses 36 in the axial direction in which the projections 35 are fitted are formed in the circumferential direction in the inner diameter surface 37 of the shaft fitting hole 22a of the hub wheel 1. The projections 35 and the recesses 36 are tight-fitted through an entire area in the circumferential direction.

In the present embodiment, each of the projections 35 has a triangle (chevron-shaped) cross section having a projected R-shaped apex, and the fitting area with respect to the recess 36 is a range A shown in FIG. 2b. Specifically, in a range of middle side portions on both sides in the circumferential direction to an apex (tooth tip) 35a in each of the projections 35 in cross section, each of the projections 35 and each of the recesses 36 are fitted. A gap 40 is formed on an inner diameter side from the inner diameter surface 37 of the hub wheel 1 between the projections 35 adjacent in the circumferential direction. A side surface 35b of each of the projections 35 has an area B where the projection 35 is not fitted in the relevant recess 36.

Figure 3A:
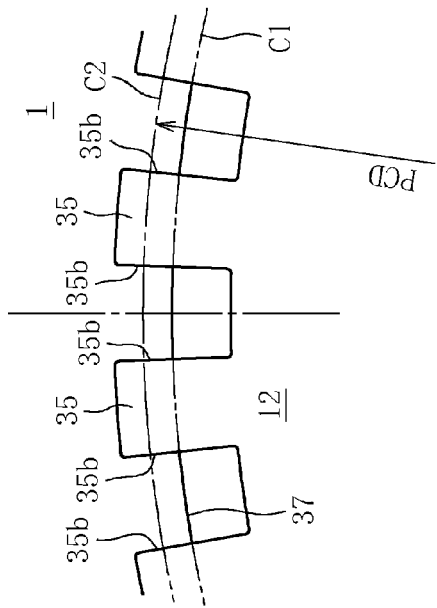
FIG. 3a is a front view of projections shown in FIG. 2b.

In the recess-projection fitting structure M, as shown in FIG. 3a as well, if on a pitch circle of the projections 35, an angle formed between a diameter direction line R (a radial line) and the side surface 35b of each of the projections 35 is θ1, θ1 is set to satisfy 0°≤θ1≤45° (in the same figure, θ1 is about 30°). Here, the pitch circle of the projections 35 is a circle C2 passing a middle point of a distance from a circle C1 passing a border portion between the area where each of the projections 35 is fitted in each of the recesses 36 and the area where each of the projections 35 is not fitted in each of the recesses 36 to each of the tooth tips 35a of the projections 35, on the side surface 35b of the projection 35. If a diameter of the pitch circle C2 of the projections 35 is PCD, and a number of the projections 35 is Z, a ratio P of Z to PCD (P=PCD/Z) is 0.3≤P≤1.0.

Figure 3B:
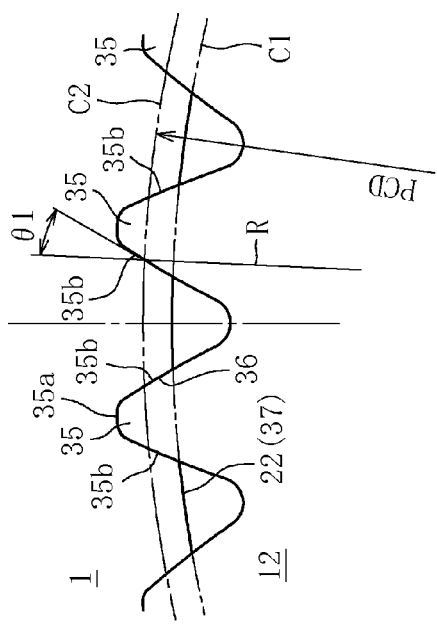
FIG. 3b is a front view showing another example of the projections shown in FIG. 2b.
Figure 3C:
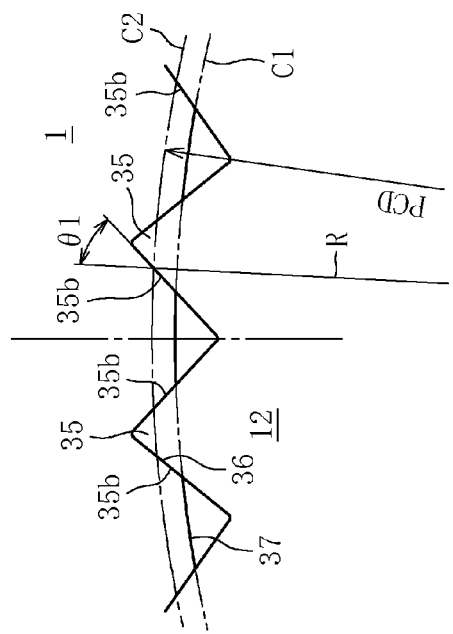
FIG. 3c is a front view showing another example of the projections shown in FIG. 2b.

While in FIGS. 2a, 2b and 3a, the projections 35 each having the triangle cross section with the R-shaped tooth tip 35a are shown, the projections 35 each having another shape as shown in FIGS. 3b and 3c can also be employed. FIG. 3b shows the projections 35 each having a rectangular cross section with θ1 set to about 0°, and FIG. 3c shows the projections 35 each having the tooth tip forming about 90°, and having a triangle cross section with θ1 set to about 45°, respectively.

The above-described recess-projection fitting structure M can be obtained through the following procedure.

First, as shown in FIGS. 1, 2a, and 2b, the male splines 41 having a number of teeth extending in the axial direction are formed in the shaft portion 12 of the joint outer ring 5, using a publicly known working method (rolling, cutting, pressing, drawing working or the like). In each of the male splines 41, an area surrounded by a circle passing a tooth bottom 42, the tooth tip (apex) 35a, and both the side surfaces 35b, 35b connecting to the tooth tip 35a is the projection 35. By forming the projections 35 of the shaft portion 12 of the male splines 41, working equipment to form the splines in this type of shaft can be used, so that the projections 35 can be formed at low cost.

Subsequently, the thermal hardening treatment is applied to an area indicated by cross hatching in FIGS. 1 and 4 in an outer diameter surface of the shaft portion 12 to form a hardened layer H. The hardened layer H is formed continuously in the circumferential direction, including the whole of the projections 35 and the tooth bottoms 42. A formation range in the axial direction of the hardened layer H is a range at least including a continuous area from end edges on the outboard side of the male splines 41 to a base end portion of the shaft portion 12 (a boarder portion between the mouse portion 11 and the shaft portion 12). As thermal hardening treatment, various quenching methods such as high-frequency quenching, carburizing quenching and the like can be employed. The high-frequency quenching is a quenching method that applies a principle of putting a portion requiring quenching into a coil through which a high-frequency current flows to generate Joule heat by an electromagnetic induction action and heat a conductive object. The carburizing quenching is a method of intruding/diffusing carbon from a surface of a low-carbon material and then performing quenching.

On the other hand, an inner diameter portion of the hub wheel 1 is maintained in an unquenched state. That is, the inner diameter surface 37 of the hole portion 22 of the hub wheel 1 is an unhardened portion (in the unquenched state) to which the thermal hardening treatment is not applied. A hardness difference between the hardened layer H of the shaft portion 12 of the joint outer ring 5 and the unhardened portion of the hub wheel 1 is 20 points or more in HRC. For example, the hardness of the hardened layer H is set to about 50 HRC to 65 HRC, and the hardness of the unhardened portion is set to about 10 HRC to 30 HRC. In the hub wheel 1, in the inner diameter surface 37 of the hole portion 22, only the area where the shaft portion fitting hole 22a is formed needs to be the unhardened portion, and the thermal hardening treatment may be applied to the other areas. Moreover, as long as the above-described hardness difference is assured, the thermal hardening treatment may be applied to the above-described area to be the "unhardened portion".

Figure 6:
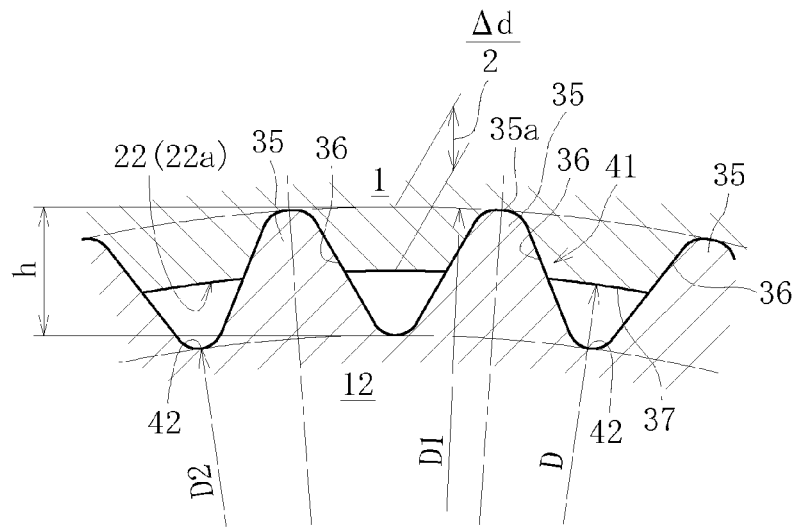
FIG. 6 is an enlarged view in the cross-sectional view perpendicular to the axis of the recess-projection fitting structure.

Intermediate portions in a height direction of the projections 35 correspond to a position of the inner diameter surface 37 of the shaft portion fitting hole 22a of the hub wheel 1 before formation of the recesses 36. Specifically, as shown in FIGS. 4 and 6, an inner diameter dimension D of the shaft portion fitting hole 22a is set to be smaller than a maximum outer diameter dimension D1 of the male splines 41 (a diameter dimension of a circumscribed circle passing the tooth tips 35a of the projections 35), and larger than a minimum outer diameter dimension D2 of the male splines 41 (a diameter dimension of a circle trajectory connecting the tooth bottoms 42) (D2<D<D1).

Figure 5A:
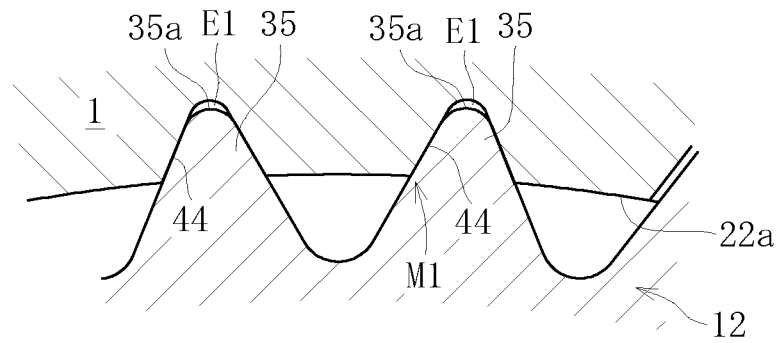
FIG. 5a is a cross-sectional view schematically showing a state where a shaft portion of a joint outer ring is in an inner diameter of a hole portion of a hub wheel.

In the hole portion 22 of the hub wheel 1, at an end portion on the inboard side of the shaft portion fitting hole 22a, that is, at an end portion on a press fitting start side of the projections 35 (the shaft portion 12), a guide portion M1 that performs guide at the time of press fitting of the projections 35 is provided. The guide portion M1 is made up of guide grooves 44 plurally provided at predetermined intervals in the circumferential direction (here, at the same intervals as a formation pitch of the projections 35) at the end portion on the inboard side of the shaft portion fitting hole 22a. A bottom diameter dimension D3 of the guide grooves 44 is set to be slightly larger than the maximum outer diameter dimension D1 of the male splines 41 (D3>D1). Thereby, as shown in FIG. 5a, in a state where the forefront portion of the shaft portion 12 (the projections 35) is arranged at the end portion on the inboard side of the shaft portion fitting hole 22a of the hub wheel 1, gaps E1 in the radial direction are each formed between the tooth tip 35a of the projection 35 and a bottom of the guide groove 44.

As shown in FIG. 4, the forefront of the shaft portion 12 of the joint outer ring 5 is arranged at the end portion on the inboard side of the hole portion 22 of the hub wheel 1, and then the shaft portion 12 is press-fitted in the shaft portion fitting hole 22a of the hub wheel 1. In the press fitting of the shaft portion 12, the respective projections 35 of the shaft portion 12 is fitted into the guide grooves 44 provided at the end portion on the inboard side of the shaft portion fitting hole 22a. This brings about a state where an axial center of the hub wheel 1 and an axial center of the joint outer ring 5 are matched. At this time, since the gaps E1 in the radial direction are formed between the projections 35 and the guide grooves 44 as described above, the fitting of the projections 35 into the guide grooves 44 can be easily performed, and in addition, the guide grooves 44 do not disturb the press fitting of the projections 35. When the forefront of the shaft portion 12 is arranged at the end portion on the inboard side of the hole portion 22 of the hub wheel 1, a seal material is beforehand applied to the outer diameter surface of the shaft portion 12 on the forefront side including the male splines 41. While the usable seal material is not particularly limited, for example, various resins can be selected to be used.

Since in the hole portion 22 of the hub wheel 1, the taper portion 22c whose diameter is reduced along the press fitting direction of the shaft portion 12 is formed, centering of the shaft portion 12 to the shaft portion fitting hole 22a of the hole portion 22 is performed upon starting the press fitting. As the press fitting of the shaft portion 12 is advanced, the press fitting of the shaft portion 12 into the shaft portion fitting hole 22a of the hub wheel 1 allows the projections 35 to dig into the inner diameter portion of the end surface on the inboard side of the hub wheel 1 and cut into a thickness of the hub wheel 1, because the inner diameter dimension D of the shaft portion fitting hole 22a, the maximum outer diameter dimension D1 of the male splines 41, and the minimum outer diameter dimension D2 of the male splines 41 have the above-described relationship. With pushing and advancing of the shaft portion 12, the inner diameter surface 37 of the shaft portion fitting hole 22a of the hub wheel 1 is cut out or pushed out by the projections 35, and the recesses 36 having the shape corresponding to the projections 35 of the shaft portion 12 are formed in the inner diameter surface 37. At this time, since the hardness of the projections 35 of the shaft portion 12 is made higher than that of the inner diameter surface 37 of the shaft fitting hole 22a of the hub wheel 1 by 20 points or more, the recesses 36 are easily formed in the inner diameter surface 37 of the shaft portion fitting hole 22a of the hub wheel 1. Making the hardness of the shaft portion 12 higher in this manner can also enhance twist strength of the shaft portion 12.

By undergoing this press fitting process, as shown in FIGS. 2a and 2b, the recesses 36 fitted to the projections 35 of the shaft portion 12 are formed in the inner diameter surface 37 of the shaft portion fitting hole 22a of the hub wheel 1. The projections 35 dig into the inner diameter surface 37 of the shaft portion fitting hole 22a of the hub wheel 1, by which the hole portion 22 is put into a state where the diameter slightly expands, thereby permitting the movement in the axial direction of the shaft portion 12 where the projections 35 are provided. On the other hand, if the movement in the axial direction stops, the inner diameter surface 37 tries to return, thereby reducing the diameter thereof. In other words, the hub wheel 1 is elastically deformed in the outer diameter direction at the time of press fitting of the projections 35, this elastic deformation precompresses surfaces of the portions where the projections 35 are fitted in the recesses 36. This brings the recesses 36 into close contact with the surfaces of the projections 35 throughout the entire axial direction. Thereby, the recess-projection fitting structure M is constructed. Since the seal material is beforehand applied to the outer diameter surface on the forefront side of the shaft portion 12 as described above, the seal material is spread across the fitting portions 38 of the projection 35 and the recesses 36 with the press fitting of the shaft portion 12. Accordingly, the intrusion of foreign matters to the fitting portions 38 can be effectively prevented.

Moreover, since with the press fitting of the shaft portion 12, plastic deformation is caused on the side of the hub wheel 1, work hardening occurs in the surfaces of the recesses 36. This results in hardening of the inner diameter surface 37 of the hub wheel 1 on the side of the recesses 36, which enhances the transmissivity of the rotary torque.

When the recess-projection fitting structure M is formed, the side where the recesses 36 are formed (here, the hub wheel 1) may be fixed, and on the other hand, the side where the projections 35 are formed (here, the shaft portion 12) may be moved. On the contrary, the side where the projections 35 are formed may be fixed, while the side where the recesses 36 are formed may be moved. Alternatively, both may be moved.

Since as described above, the taper portion 22c can function as a guide when the press fitting of the shaft portion 12 is started, press fitting accuracy of the shaft portion 12 can be enhanced. In addition, since the guide grooves 44 (the guide portion M1) are provided at the end portion on the inboard side of the shaft portion fitting hole 22a, which is a front side in the press fitting direction of the shaft portion 12 with respect to the taper portion 22c, the projections 35 can be press-fitted along these guide grooves 44. Since this further enhances the press fitting accuracy, a situation where the projections 35 are press-fitted in an axial misalignment state or in an inclined state can be more effectively prevented, so that the high-accuracy recess-projection fitting structure M can be obtained. Moreover, since when the shaft portion 12 is press-fitted, the seal material applied to the outer diameter surface of the shaft portion 12 functions as a lubricant, the shaft portion 12 can be press-fitted smoothly.

Figure 5B:
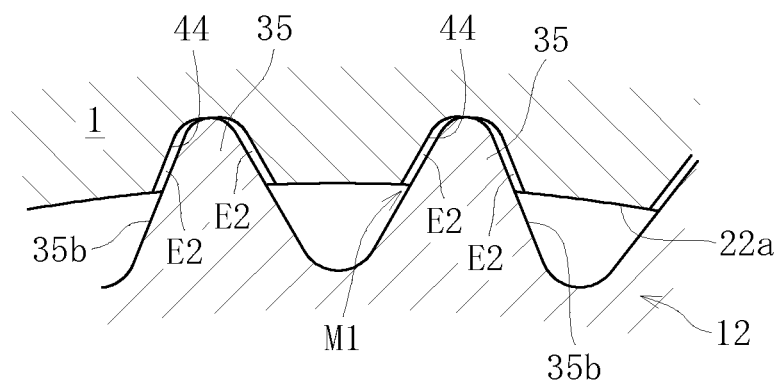
Figure 5C:
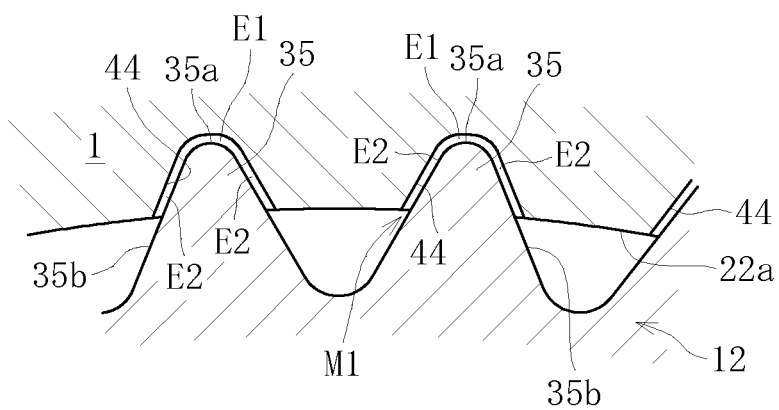

While in the present embodiment, as described above, each of the guide grooves 44 is formed in the end portion on the inboard side of the shaft portion fitting hole 22a so that the gap E1 in the radial direction is formed between each of the tooth tips 35a of the projections 35 and each of the guide grooves 44, the formation aspect of the guide grooves 44 is not limited thereto. For example, as shown in FIG. 5b, each of the guide grooves 44 may be formed so that gaps E2 in the circumferential direction are formed between the side surfaces 35b of each of the projections 35 and the relevant guide groove 44. Moreover, as shown in FIG. 5c, each of the guide grooves 44 may be formed so that the gap E1 in the radial direction is formed between the tooth tip 35a of the projection 35 and the guide groove 44, and the gaps E2 in the circumferential direction are formed between the side surfaces 35b of the projection 35 and the guide groove 44.

As shown in FIG. 1, the press fitting of the shaft ring 12 is performed until the back surface 11a of the mouse portion 11 abuts on the end surface 31a of the caulking portion 31 of the hub wheel 1. In this manner, causing the end surface 31a of the caulking portion 31 of the hub wheel 1 and the back surface 11a of the mouse portion 11 of the joint outer ring 5 to abut on each other enhances bending rigidity in the axial direction of the wheel bearing device, thereby bringing about a high-quality, durable product. Moreover, since relative positioning of the shaft portion 12 of the joint outer ring 5 to the hub wheel 1 is enabled, dimension accuracy of the bearing device is stabilized, and a length in the axial direction of the recess-projection fitting structure M is stabilized, which can enhance the torque transmissibility. Furthermore, since this abutment enables the seal structure to be constructed between the hub wheel 1 and the mouse portion 11, the intrusion of foreign matters from the caulking portion 31 to the recess-projection fitting structure M can be prevented. This enables the fitting state of the recess-projection fitting structure M to be stably maintained over a long period of time.

However, when the end surface 31a of the hub wheel 1 and the back surface 11a of the mouse portion 11 are brought into contact with each other, a contact surface pressure of both is desirably 100 MPa or less. This is because if the contact surface pressure exceeds 100 MPa, there is a possibility that even in the precompressed contact surface, the torque transmission is performed, which allows a larger torque to be loaded, and when the contact surfaces become disabled to cope with the torque transmission, the contact surfaces rapidly slip and abnormal noise occurs. Accordingly, setting the contact surface pressure to 100 MPa or less enables the silent wheel bearing device in which abnormal noise does not occur to be provided.

At the time point when the press fitting of the shaft portion 12 is completed, that is, the back surface 11a of the mouse portion 11 and the end surface 31a of the caulking portion 31 of the hub wheel 1 come into contact, the small-diameter portion 12a of the shaft portion 12 is in non-contact with the inner diameter surface 37 of the hole portion 22 (the shaft portion fitting hole 22a) of the hub wheel 1 and the end surface on the inboard side of the inner wall 22d. Thereby, a pocket portion 46 storing a sticking-out portion 45 formed with the formation of recesses 36 is formed on the outer diameter side of the small-diameter portion 12a of the shaft portion 12.

Figure 7:
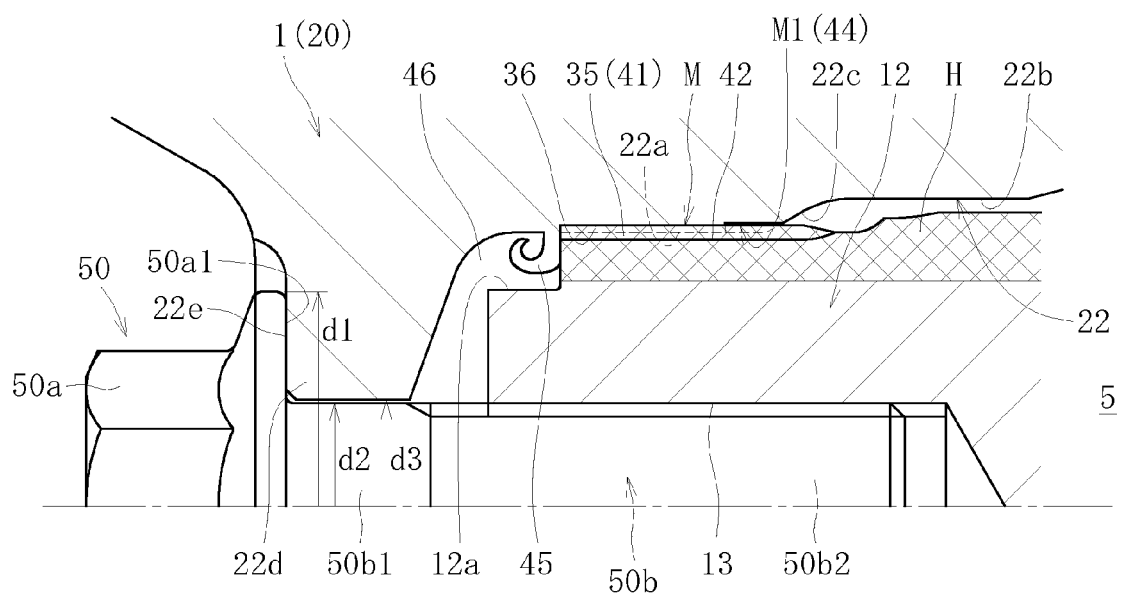
FIG. 7 is an enlarged view showing a vicinity of the recess-projection fitting structure.

When the shaft portion 12 of the joint outer ring 5 is press-fitted into the hole portion 22 of the hub wheel 1, as shown in FIG. 7, the material (thickness of the hub wheel 1) sticks out from the recesses 36 by a cutting-out or pushing out action by the projections 35, thereby forming the sticking-out portion 45. The sticking-out portion 45 is produced by an amount corresponding to a volume of the portions of the projections 35 fitted in the recesses 36. If this sticking-out portion 45 is left unsolved, there is a possibility that this drops off to enter an inside of the vehicle. Against this, forming the above-described pocket portion 46 allows the sticking-out portion 45 to be stored and held in the pocket portion 46 while curling. This can prevent the sticking-out portion 45 from dropping off, so that the above-described trouble can be solved. Moreover, in this case, the sticking-out portion 45 can be left stored in the pocket portion 46, which makes it unnecessary to separately perform removal processing of the sticking-out portion 45. Accordingly, assembling work man-hours can be decreased, which can achieve enhancement of assembling workability and cost reduction.

As a shape of the pocket portion 46, any shape that enables the produced sticking-out portion 45 to be stored suffices, and the shape is modifiable as needed. In order to exert the above-described work effect, it is essential that the volume of the pocket portion 46 should be larger than at least an expected production amount of the sticking-out 45.

The recess-projection fitting structure M constructed as described above is desirably arranged so as to avoid the inner diameter side of the raceway surfaces 26, 27, 28, 29 of the wheel bearing 2. Particularly, the inner diameter side of intersection points with lines that contact angles pass on the inner raceway surfaces 28, 29 is avoided, and in a partial area in the axial direction between these intersection points, the recess-projection fitting structure M is more desirably formed. This is because an increase in hoop stress of the bearing raceway surfaces (tensile stress of the outer diameter portion of the hub wheel 1 and the outer diameter portion of the inner ring 24) can be effectively suppressed or prevented. If the increase in hoop stress can be suppressed or prevented, troubles such as decrease in rolling fatigue life, crack generation, stress corrosion crack and the like can be prevented from occurring, which enables the high-quality bearing 2 to be provided.

Moreover, as shown in FIG. 6, when the above-described recess-projection fitting structure M is constructed, if a press fitting margin of each of the projections 35 to the hub wheel 1 is $\Delta d$ and a height of the projections 35 is h, $\Delta d/2$ h is desirably set to a range of $0.3 < \Delta d/2$ h$< 0.86$. Here, the press fitting margin $\Delta d$ is represented by a diameter difference (D1−D) between the maximum outer diameter dimension D1 of the male splines 41 provided in the shaft portion 12, and the inner diameter dimension D of the shaft portion fitting hole 22a of the hub wheel 1. This allows a vicinity of the intermediate portion in the height direction of each of the projections 35 to dig into the inner diameter surface of the hub wheel 1, and thus, the press fitting margin of the projections 35 can be sufficiently assured, and the recesses 36 can be surely formed.

If $\Delta d/2$ h is 0.3 or less, the twist strength decreases, and if $\Delta d/2$ h is 0.86 or more, the entire projection 35 digs into the counterpart due to minute axial misalignment or press fitting inclination at the time of press fitting, thus rapidly increasing a press fitting load, so that there is posed a possibility that a forming property of the recess-projection fitting structure M is deteriorated. If the forming property of the recess-projection fitting structure M is deteriorated, not only the twist strength is decreased but an expansion amount of the outer diameter of the hub wheel 1 is also increased, and thus, the function of the wheel bearing 2 with the hub wheel 1 as a component is adversely affected, which causes a problem that a rotation life is shortened or the like. In contrast, setting $\Delta d/2$ h to the above-described range makes the forming property of the recess-projection fitting structure M stable, and eliminates the variation in press fitting load, so that the stable twist strength can be obtained.

Since in the above-described recess-projection fitting structure M, the whole of the fitting sites 38 between the projections 35 and the recesses 36 is in close contact, rattle in the radial direction and in the circumferential direction can be suppressed. Therefore, while the coupling portion (the recess-projection fitting structure M) of the hub wheel 1 and the joint outer ring 5 can be made compact, high load capability can be assured, and the wheel bearing device can be made small and lightweight. Moreover, since the rattle in the recess-projection fitting structure M can be suppressed, abnormal noise occurrence at the time of torque transmission can be effectively prevented.

Moreover, since in the member where the projections 36 are formed (in the present embodiment, the hub wheel 1), the female splines or the like need not be formed beforehand, a working cost can be reduced, and productivity can be increased. In assembling the hub wheel 1 and the shaft portion 12 of the joint outer ring 5, phase matching between the splines can be omitted, which can enhance assemblability. Furthermore, damage of the tooth surface at the time of press fitting can be avoided, so that the stable fitting state can be maintained. Moreover, as described above, since the inner diameter side of the hub wheel 1 has a lower hardness, the recesses 36 formed in the hub wheel 1 are fitted to the projections 35 of the shaft portion 12 with a high close-contact property. This is more effective to the rattle prevention in the radial direction and in the circumferential direction.

Moreover, as shown in FIG. 3, since on the pitch circle C of the respective projections 35, the angle $\theta 1$ formed between the diameter direction line (radial line) and the side surface 35b of each of the projections 35 is set to the range of $0° \leq \theta 1 \leq 45°$, a diameter expansion amount of the hub wheel 1 after the press fitting is made smaller, which enhances a press fitting property. This is because while the press fitting of the shaft portion 12 expands the diameter of the hole portion 22 of the hub wheel 1, if $\theta 1$ is too large, a diameter expansion force at the time of press fitting easily works, thereby increasing the diameter expansion amount of the outer diameter of the hub wheel 1 at the end of the press fitting, so that the tensile stress (hoop stress) of the outer diameter portion of the hub wheel 1 and the outer diameter portion of the inner ring 24 of the bearing 2 becomes high, moreover, since a component force in the radial direction at the time of torque transmission becomes larger, the outer diameter of the hub wheel 1 expands, and the tensile stress of the outer diameter portion of the hub wheel 1 and the outer diameter portion of the inner ring 24 becomes higher, and so on. These increases in tensile stress lead to a deterioration in bearing life.

Moreover, if the pitch circle diameter of the projections 35 is PCD, and the number of the projections 35 is Z, $0.30 \leq PCD/Z \leq 1.0$ is satisfied. If PCD/Z is too small (if PCD/Z is smaller than 0.30), an application range of the press fitting margin of the projections 35 to the member (here, the hub wheel 1) where the recesses 36 are to be formed is very narrow, and a dimension tolerance is also narrow, which makes the press fitting difficult.

Particularly, satisfying $20° \leq \theta 1 \leq 35°$ and $0.33 \leq PCD/Z \leq 0.7$ enables the recesses 36 to be formed by the projections 35 by press-fitting the shaft portion 12 formed of a general steel for machine structural use without taking measures such as use of a special steel for a formation material of the shaft portion 12 (the joint outer ring 5), application of surface treatment to the projections 35, a sharp shape of each of the projections 35 and the like. In addition, the diameter expansion amount of the outer diameter of the hub wheel 1 after the press fitting of the shaft portion 12 can be kept small. Moreover, in the case where the projections 35 are provided on the side of the shaft portion 12, satisfying $\theta 1 \geq 20°$ allows the projections 35 to be formed by rolling working most excellent in balance between cost and working accuracy among the above-described working methods.

When the press fitting of the shaft portion 12 is completed, the bolt member 50 is screwed and attached into the bolt hole 13 of the shaft portion 12 from the outboard side to bolt-fix the shaft portion 12 of the joint outer ring 5 to the hub wheel 1. The screwing and attachment of the bolt member 50 into the bolt hole 13 is performed by causing the seating surface 50a1 of the head portion 50a of the bolt member 50 to abut on the end surface on the outboard side of the hub wheel 1, here, the bottom surface of the depressed portion 22e formed in the inner wall 22d. This allows the hub wheel 1 to be sandwiched in the axial direction between the head portion 50a of the bolt member 50 and the mouse portion 11 (the back surface 11a thereof) of the joint outer ring 5. In this manner, by bolt-fixing the shaft portion 12 of the joint outer ring 5 to the hub wheel 1 by the bolt member 50, coming-off of the joint outer ring 5 from the hub wheel 1 is restricted, which produces the reliable device structure. Moreover, the hub wheel 1 is sandwiched between the bolt member 50 and the mouse portion 11, which can further enhance the bending rigidity in the axial direction of the device, and further increase durability.

Figure 8A:
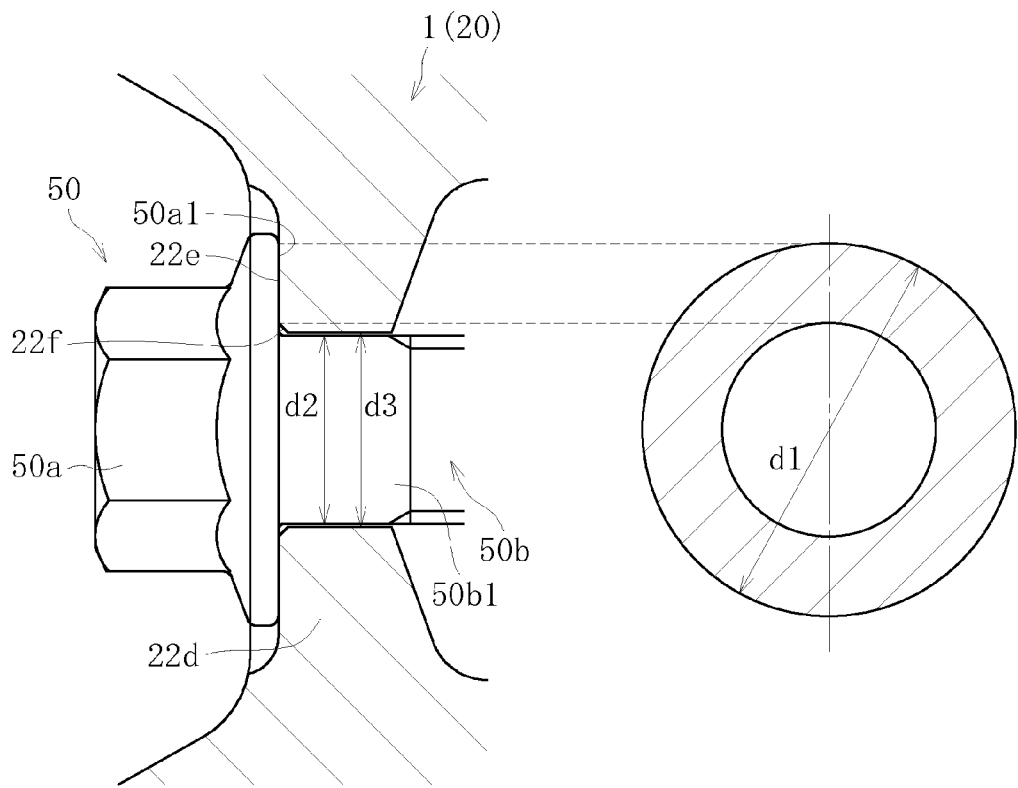
FIG. 8a is an enlarged view showing a vicinity of a head portion of a bolt member.

However, some selected bolt members 50 have a possibility of adversely affecting the assemblability of the bearing device, and torque transmissibility, and durability life. Consequently, as a result of repeated verification by the present inventor et al., it is found that as shown in FIG. 8a, if a seating surface outer diameter of the bolt member 50 is d1, and the shaft diameter of the bolt member 50 (the screw shaft portion 50b) is d2, the above-described various troubles can be solved by using the bolt member 50 in which a value of $(d1/d2)^2$ falls within a predetermined range. Specifically, the bolt member 50 satisfying a relational expression of $2.3 \leq (d1/d2)^2 \leq 4.9$ is used. The reason is as follows.

For making the value of $(d1/d2)^2$ small, it is only necessary to make the seating surface outer diameter d1 smaller or to make the shaft diameter d2 larger. However, if the seating surface outer diameter d1 is made too small, abrasion or indentation is easily caused in the bottom surface of the depressed portion 22e formed in the hub wheel 1, and if the shaft diameter d2 is made large, a bolt axial force easily becomes large. In the present embodiment, since the end surface 31a of the hub wheel 1 and the back surface 11a of the mouse portion 11 of the joint outer ring 5, which are opposed to each other, are brought into contact, if the bolt axial force becomes excessive, the contact surface pressure between both becomes high, which easily causes abnormal noise (stick-slip sound) when both relatively rotate or the like. It is considered that these problems can be solved by making the value of $(d1/d2)^2$ larger, and in order to make the value of $(d1/d2)^2$ larger, the seating outer diameter d1 needs to be made larger, or the shaft diameter d2 needs to be made smaller. However, making the seating surface outer diameter d1 too large causes limitation in shape of the hub wheel 1 that receives the head portion 50a of the bolt member 50, so that in addition to a decrease in design freedom degree of the hub wheel 1, various troubles are posed such as a deterioration in assemblability, difficulty with fastening torque management of the bolt member 50, and so on, and on the other hand, if the shaft diameter d2 is made smaller, the bolt axial force is decreased. Accordingly, in light of the above-described situations, as the bolt member 50, a bolt member satisfying the relational expression of $2.3 \leq (d1/d2)^2 \leq 4.9$ is desirably used, which can solve the above-described various problems. Moreover, the use of the above-describe bolt member 50 can prevent a decrease in fastening force due to bolt loosening, and intrusion of muddy water to the recess-projection fitting structure M attributed to this can be prevented as much as possible.

It is considered that establishing the above-described relational expression of $(d1/d2)^2$ is related to an area of the seating surface 50a1 (a hatching portion in a right figure of FIG. 8a) and a cross-sectional area of the screw shaft portion 50b of the bolt member 50. Since an inner diameter of the seating surface 50a1 has a dimension approximate to the shaft diameter d2 of the bolt member 50, the relational expression of $(d1/d2)^2$ is established.

Figure 8B:
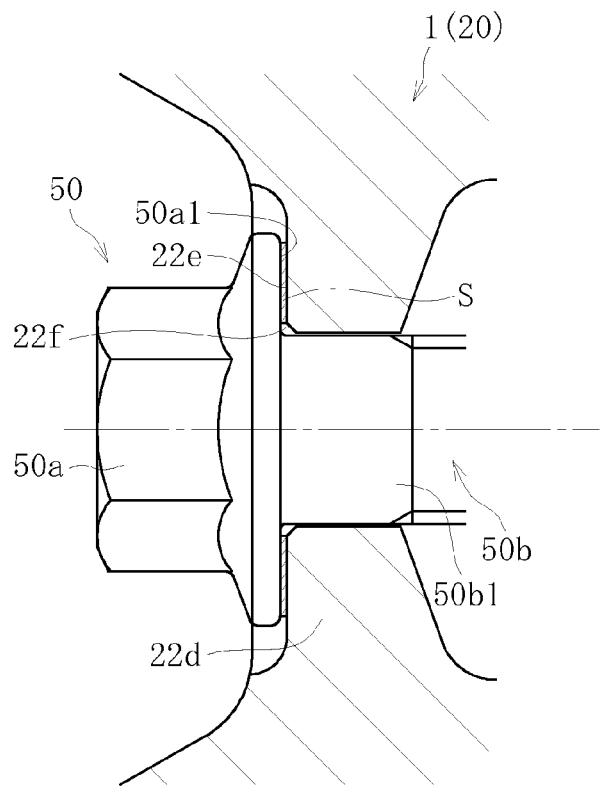

As shown in FIG. 8b, a seal material S may intervene between the seating surface 50a1 of the bolt member 50 and the bottom surface of the depressed portion 22e provided in the inner wall 22d. Since this can assure the close-contact property between both, intrusion of rain water or foreign matters to the recess-projection fitting structure M from the outboard side can be prevented. While as long as the close-contact property can be assured, the usable seal material S is not particularly limited, for example, various resins can be selected as in the seal material applied to the outer diameter surface of the shaft portion 12. Obviously, the seal material S intervening between the seating surface 50a1 of the bolt member 50 and the bottom surface of the depressed portion 22e may be of a different type from that of the seal material applied to the outer diameter surface of the shaft portion 12.

If the seating surface 50a1 of the bolt member 50 and the bottom surface of the depressed portion 22e formed in the inner wall 22d come into close contact without any gap, the seal material S need not intervene between both. For example, grinding the bottom surface of the depressed portion 22e enhances the close-contact property to the seating surface 50a1 of the bolt member 50, and thus, the seal material S can be omitted, as shown in FIG. 8a. As long as the close-contact property is assured, the grinding working to the depressed portion 22e can be omitted, and a cast surface or a turning finish state can be left as it is.

Even in the case where the seal material S intervenes between the seating surface 50a1 of the bolt member 50 and the bottom surface of the depressed portion 22e, for the above-described same reason, as the bolt member 50, a bolt member satisfying the relational expression of $2.3 \leq (d1/d2)^2 \leq 4.9$ is desirably used.

In the wheel bearing device described above, when the need to apply the repair or the like arises, the bearing portion (wheel bearing 2) and the joint portion (the constant velocity universal joint 3) can be maintained and repaired individually, and thus, the separation between the joint outer ring and the hub wheel 1 is permitted. The separation between the joint outer ring 5 and the hub wheel 1 is performed by detaching the bolt member 50 from the completed product shown in FIG. 1, and then applying a drawing force equal to or more than the fitting force of the recess-projection fitting structure M between the hub wheel 1 and the shaft portion 12 of the joint outer ring 5 to draw the shaft portion 12 of the joint outer ring 5 from the hub wheel 1. Here, taking, as one example, a case where after the hub wheel 1 and the joint outer ring 5 are separated, the separated hub wheel 1 and joint outer ring 5 are recoupled as they are, a method for separation and recoupling of both will be described in detail.

Figure 9:
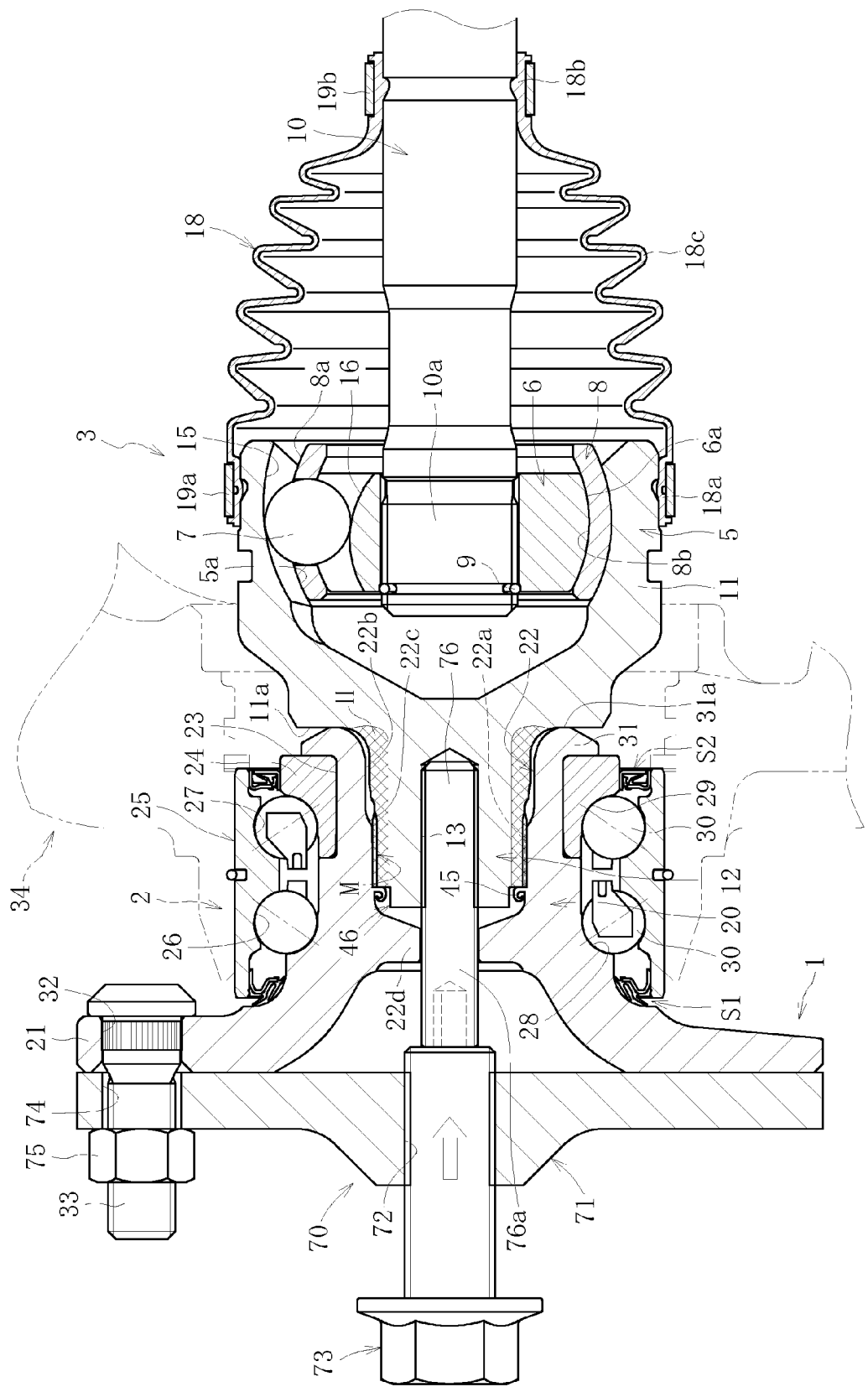
FIG. 9 is a cross-sectional view showing a separation process of the wheel bearing device shown in FIG. 1.

The drawing of the shaft portion 12 from the hub wheel 1 can be performed, using, for example, a jig 70 as shown in FIG. 9. The jig 70 includes a base 71, a bolt member for pressing 73 that is screwed into a screw hole 72 of this base 71, and a screw shaft 76 that is screwed into the bolt hole 13 of the shaft portion 12. A through-hole 74 is provided in the base 71, a nut member 75 is screwed onto the bolt 33 of the hub wheel 1, the bolt 33 being inserted into the through-hole 74. This puts the base 71 and the flange 21 of the hub wheel 1 into a superimposed state, and the base 71 is mounted on the hub wheel 1. After the base 71 is mounted on the hub wheel 1 in this manner, the screw shaft 76 is screwed into the bolt hole 13 of the shaft portion 12 so that a base portion 76a protrudes from the inner wall 22d to the outboard side. A protrusion amount of the base portion 76a is set to be longer than the length in the axial direction of the recess-projection fitting structure M.

The bolt member for pressing 73 is disposed on the same axial center as that of the screw shaft 76, the bolt member for pressing 73 is screwed and attached into the screw hole 72 of the base 71 from the outboard side, and in this state, the bolt member for pressing 73 is screwed and advanced in a white arrow direction in FIG. 9. Since the screw shaft 76 and the bolt member for pressing 73 are disposed on the same axial center, when the bolt member for pressing 73 is screwed and advanced, the screw shaft 76 is pressed to the inboard side. With this, the joint outer ring 5 moves to the inboard side with respect to the hub wheel 1, and when the bolt member for pressing 73 is screwed and advanced to some extent, the joint outer ring 5 is detached from the hub wheel 1.

From the state where the joint outer ring 5 is detached from the hub wheel 1, the bolt member 50 can be used to join the hub wheel 1 and the joint outer ring 5 again. That is, in a state where the base 71 is detached from the hub wheel 1 and the screw shaft 76 is detached from the shaft portion 12, the bolt member 50 is screwed into the bolt hole 13 of the shaft portion 12. At this time, the projections 35 on the side of the shaft portion 12, and the recesses 36 of the hub wheel 1 formed by the last press fitting of the shaft portion 12 are subjected to phase matching. Since the guide grooves 44 are provided on the inboard side of the recesses 36 formed in the hole portion 22 of the hub wheel 1, the projections 35 and the guide grooves 44 are matched in phase in the circumferential direction, when the phase matching between the projections 35 and the recesses 36 is completed.

When the bolt member 50 is rotated in this state to screw the bolt member 50 into the bolt hole 13, a thrust force generated by this screwing press-fits the shaft portion 12 into the shaft portion fitting hole 22a of the hub wheel 1. Thereby, as in the last press fitting, the recess-projection fitting structure M where the whole of the fitting sites of the projections 35 to the recesses 36 is brought into close contact with the corresponding recesses 36 is reconstructed, and the joint outer ring 5 and the hub wheel 1 are recoupled.

In this manner, if screwing the bolt member 50 into the bolt hole 13 again enables the recess-projection fitting structure M to be reconstructed, the recess-projection fitting structure M can be reconstructed without using large-scale equipment such as a pressing machine for press fitting and the like. The thrust force by the screwing of the bolt member 50 is used to enable the reconstruction of the recess-projection fitting structure M (the recoupling of the joint outer ring 5 and the hub wheel 1). This is because since another press-fitting is performed by press-fitting the shaft portion 12 (the projection 35) in the inner diameter surface 37 of the shaft portion fitting hole 22a with the projections 36 formed, the press fitting load becomes smaller than that in the first time. As described above, in a field site such as a car repair factory and the like, the separation and recoupling of the hub wheel 1 and the joint outer ring 5, that is, inspection, maintenance, repair and the like of the wheel bearing device can be easily performed, which can bring about high maintainability.

The separation and recoupling of the hub wheel 1 and the joint outer ring 5 as described above can be performed in a state where the outer member 25 of the bearing 2 remains mounted on the knuckle 34 of the vehicle, as shown in FIG. 9. Therefore, the maintainability in the field site is particularly favorable.

As shown in FIG. 8, since the inner diameter dimension d3 of the inner wall 22d of the hub wheel 1 is set to be slightly larger than the shaft diameter d2 of the bolt member 50 (the screw shaft portion 50b) (specifically, 0.05 mm<d3−d2<0.5 mm is satisfied), an outer diameter of the screw shaft portion 50b of the bolt member 50 and the inner diameter of the inner wall 22d can make up a guide when the bolt member 50 is screwed and advanced into the bolt hole 13. This prevents axial misalignment of the bolt member 50, and the shaft portion 12 of the joint outer ring 5 can be press-fitted into the hole portion 22 of the hub wheel 1 with high accuracy. If a dimension in the axial direction of the inner wall 22d is too small, there is a possibility that the stable guide function cannot be exerted. On the other hand, if the dimension in the axial direction of the inner wall 22d is too large, the length in the axial direction of the recess-projection fitting structure M cannot be assured, and also leads to an increase in weight of the hub wheel 1. Accordingly, the dimension in the axial direction of the inner wall 22d to be provided in the hub wheel 1 is decided in view of the above-described situations.

Figure 10:
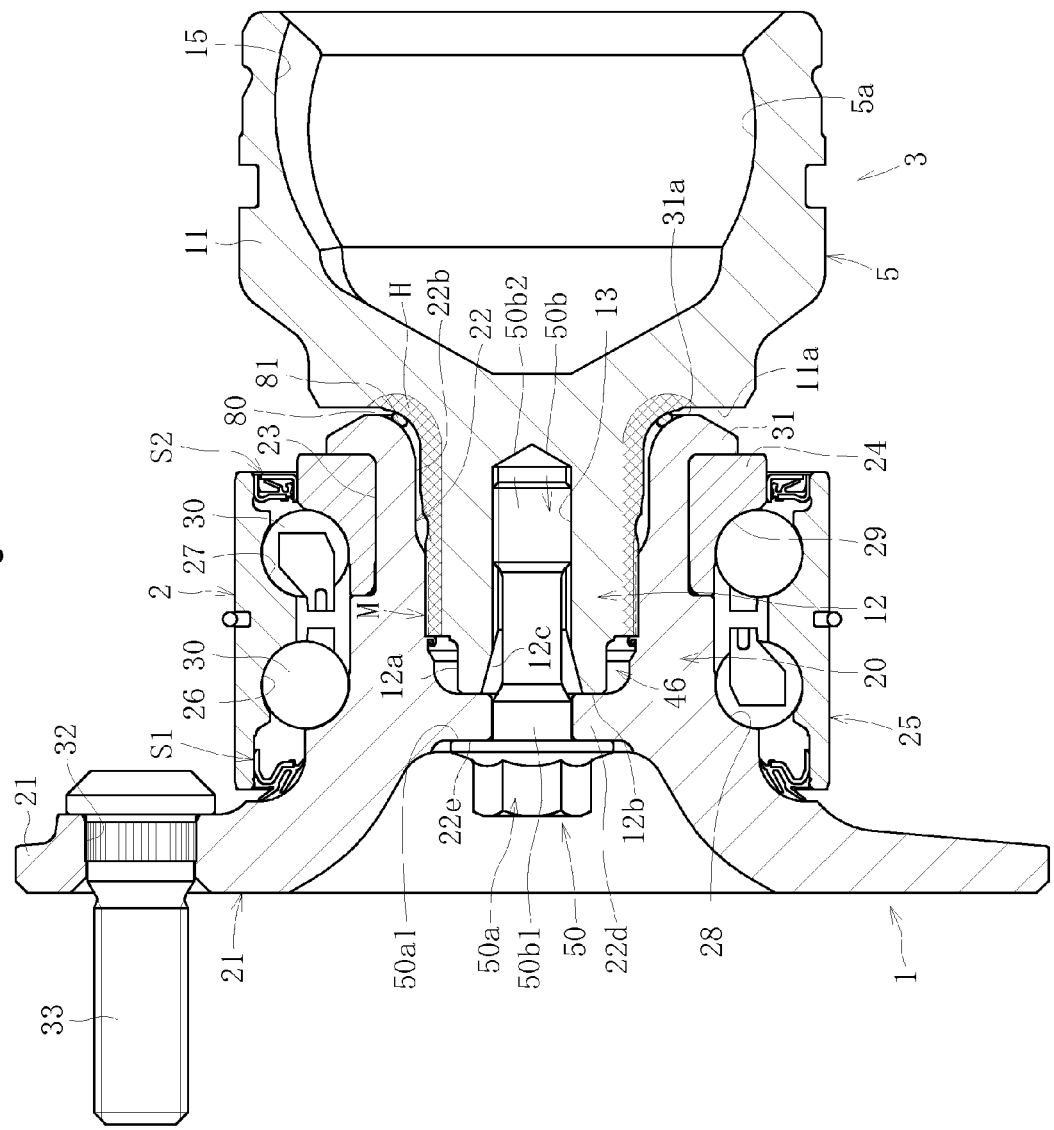
FIG. 10 is a cross-sectional view showing a wheel bearing device according to a second embodiment of the present invention.

FIG. 10 is a cross-sectional view showing a wheel bearing device according to a second embodiment of the present invention. A different point of the bearing device shown in the same figure from the bearing device shown in FIG. 1 is that the end surface 31a of the caulking portion 31 of the hub wheel 1 and the back surface 11a of the mouse portion 11 are in non-contact, while the small-diameter portion 12a of the shaft portion 12 is made longer, and the end surface (end surface on the outboard side) 12b of the shaft portion 12 abuts on the end surface on the inboard side of the inner wall 22d of the hub wheel 1. In this case, the head portion 50a of the bolt member 50 and the end surface 12b on the outboard side of the shaft portion 12 sandwich the inner wall 22d of the hub wheel 1 in the axial direction, by which positioning in the axial direction of the hub wheel 1 and the joint outer ring 5 is performed.

Figure 11A:
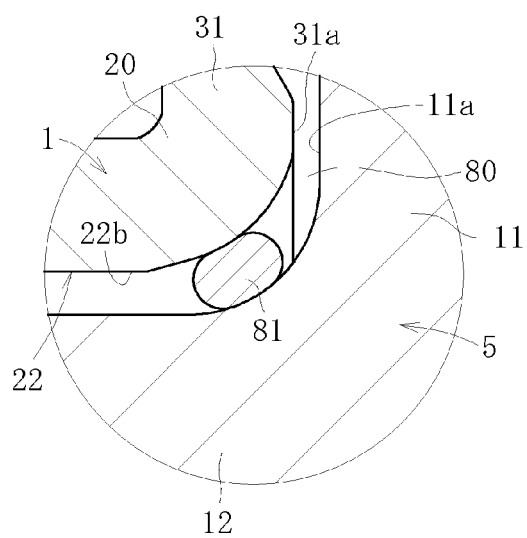
FIG. 11a is an enlarged cross-sectional view of a substantial part of FIG. 10.

Moreover, in this case, as shown in FIG. 11a, a gap 80 is provided between the end surface 31a of the caulking portion 31 and the back surface 11a of the mouse portion 11. The gap 80 is formed from a space between the caulking portion 31 of the hub wheel 1 and the back surface 11a of the mouse portion 11 to a space between the large-diameter hole 22b of the hub wheel 1 and the shaft portion 12. In this manner, the mouse portion 11 and the hub wheel 1 has no contact, which can more effectively prevent the occurrence of abnormal noise attributed to contact of both.

Figure 11B:
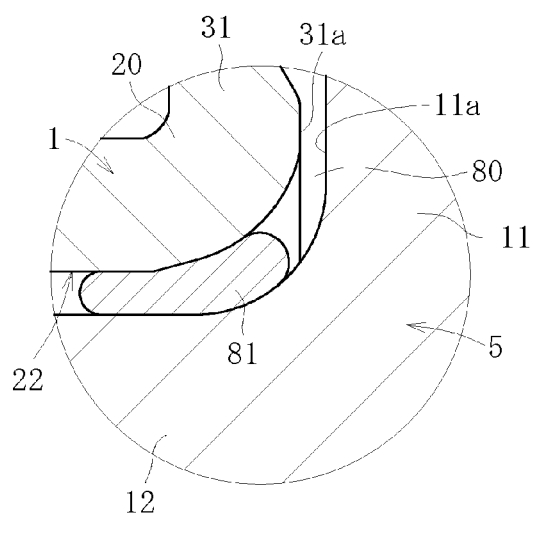

When the above-described constitution is employed, foreign matter intrusion preventing means to the recess-projection fitting structure M is provided on the inboard side from the recess-projection fitting structure M. Specifically, as shown in FIG. 11a, a seal member 81 fitted in and attached to the gap 80 between the caulking portion 31 of the hub wheel 1 and the back surface 11a of the mouse portion 11 makes the foreign matter intrusion preventing means. In this manner, the seal member 81 blocks the gap 80 between the caulking portion 31 of the hub wheel 1 and the back surface 11a of the mouse portion 11, which can prevent intrusion of rain water and foreign matters to the recess-projection fitting structure M from this gap 80. As the seal member 81, a commercially available O ring or the like as shown in FIG. 11a can be used, and besides, for example, a gasket or the like as shown in FIG. 11b can also be used.

In this embodiment, the bolt member 50 screwed and attached in the bolt hole 13 of the shaft portion 12 has a small-diameter portion between the base portion 50b1 and the screw portion 50b2 making up the screw shaft portion 50b, and the shaft diameter d2 of the screw shaft portion 50b is not constant throughout an entire length of the screw shaft portion 50b. In the case where the shaft portion 12 is bolt-fixed to the hub wheel 1, using the above-described bolt member 50, in order to prevent a trouble such as bolt loosening, if shaft diameters of the base portion 50b1 and the screw portion 50b2 are almost the same and these shaft diameters are d2, the bolt member 50 satisfying the relational expression of $2.3 \leq (d1/d2)^2 \leq 4.9$ may be sufficiently used.

Moreover, in the wheel bearing device according to the second embodiment, an opening portion of the bolt hole 13 of the shaft portion 12, the taper portion 12c whose diameter expands toward the opening side (outboard side) is provided. The formation of the above-described taper portion 12c makes it easy to screw, into the bolt hole 13, the bolt member 50 used when fastening the hub wheel 1 and the shaft portion 12 of the joint outer ring 5, and the screw shaft 76 used when separating the hub wheel 1 and the joint outer ring 5. The above-described constitution is also applicable to the bearing device according to the first embodiment shown in FIG. 1 and the like.

Constitutions other than the foregoing are substantially the same as the bearing device shown in FIG. 1, and thus, common reference numerals are given and redundant description is omitted.

Figure 12A:
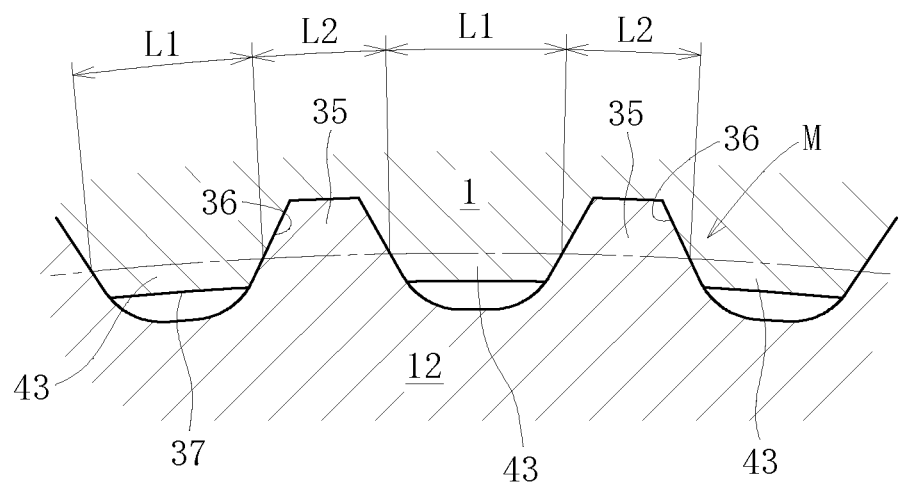
FIG. 12a is a cross-sectional view perpendicular to the axis showing another example of the projections of the recess-projection fitting structure.

In the embodiment described above, as shown in FIGS. 2a and 2b, the pitch of the projections 35 and the pitch of the recesses 36 are set to the same value. Thus, as shown in FIG. 2b, in the intermediate portion in the height direction of the projection 35, a thickness L in the circumferential direction of the projection 35, and a groove width L0 between the adjacent projections have almost the same value. In contrast, as shown in FIG. 12a, in the intermediate portion in the height direction of the projection 35, a thickness L2 in the circumferential direction of the projection 35 can also be made smaller than a groove width L1 between the adjacent projections. In other words, in the intermediate portion in the height direction of the projection 35, the thickness L2 in the circumferential direction of the projection 35 of the shaft portion 12 is made smaller than the thickness L1 in the circumferential direction of a protruded portion 43 of the hub wheel 1 (L2<L1).

By the above-described relationship in the respective projections 35, a summation Σ of the thicknesses L2 in the circumferential direction of the projections 35 of the shaft portion 12 can be set to be smaller than a summation Σ1 of the thicknesses L1 in the circumferential direction of the protruded portions 43 of the hub wheel 1. This can increase a shear area of each of the protruded portions 43 of the hub wheel 1, and twist strength can be assured. In addition, since the tooth thickness of each of the projections 35 is small, the press fitting load becomes small, thereby enhancing the press fitting property.

At this time, all the projections 35 and the protruded portions 43 need not satisfy the relationship of L2<L1, and as long as the summation Σ of the thicknesses in the circumferential direction of the projections 35 of the shaft portion 12 becomes smaller than the summation Σ1 of the thicknesses in the circumferential direction of the protruded portions 43 of the hub wheel 1, a part of the projections 35 and a part of the protruded portions 43 may satisfy L2=L1, or L2>L1.

Figure 12B:
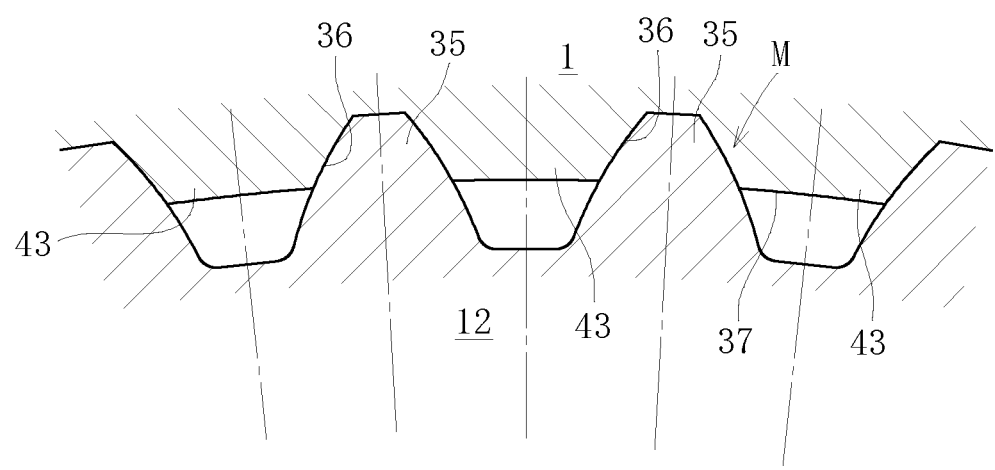
FIG. 12b is a cross-sectional view perpendicular to the axis showing another example of the projections of the recess-projection fitting structure.

While in FIG. 12a, the projections 35 are each formed into a trapezoidal cross-sectional shape, the cross-sectional shape of the projections 35 is not limited thereto. For example, as shown in FIG. 12b, the projections 35 can be each formed into an involute cross-sectional shape.

Figure 13A:
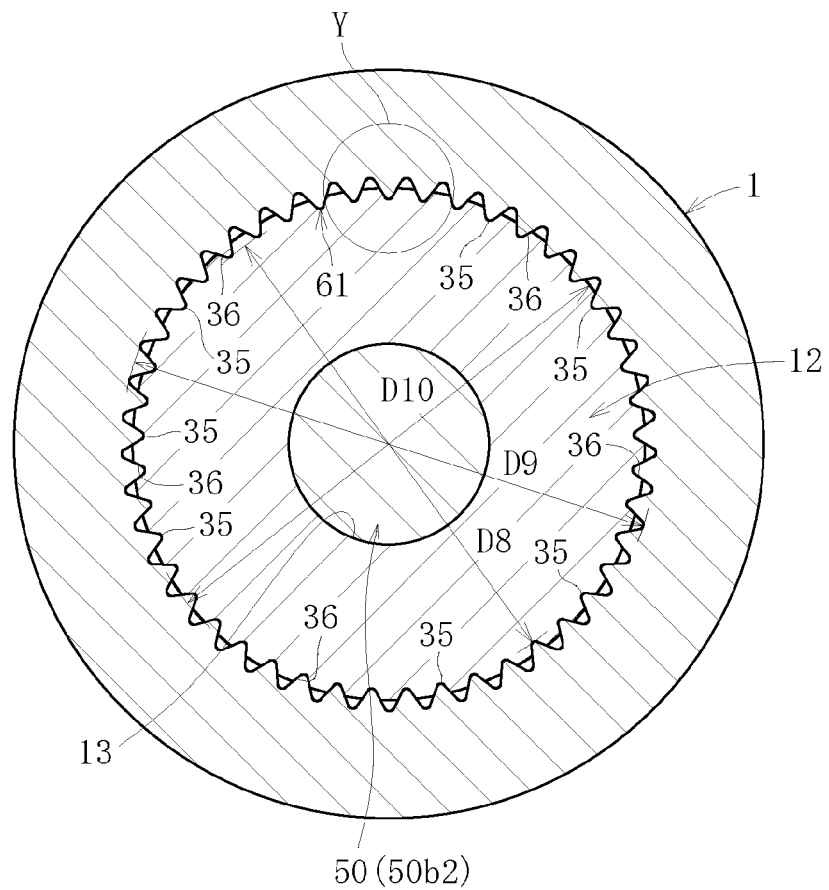
FIG. 13a is a cross-sectional view perpendicular to the axis showing another example of the recess-projection fitting structure.

Moreover, while in the embodiments described above, the male splines 41 (projections 35) are formed on the side of the shaft portion 12, on the contrary, as described FIG. 13, by forming female splines 61 in the inner diameter surface of the hole portion 22 of the hub wheel 1, the projections 35 can be formed on the side of the hub wheel 1. In this case, as in the case where the male splines 41 are formed in the shaft portion 12, for example, by means of applying thermal hardening treatment to the female splines 61 of the hub wheel 1, and on the other hand, putting the outer diameter surface of the shaft portion 12 into an unquenched state, the hardness of the projections 35 of the hub wheel 1 is higher than the outer diameter surface of the shaft portion 12 by 20 points or more in HRC. The female splines 61 can be formed by various working methods such as publicly known broaching, cutting, pressing, drawing working and the like. As the thermal hardening treatment, various thermal treatments such as high-frequency quenching, carburizing quenching and the like can be employed.

Thereafter, by press-fitting the shaft portion 12 into the hole portion 22 of the hub wheel 1, the recesses 36 to fit to the projections 35 are formed in the outer diameter surface of the shaft portion 12 by the projections 35 on the side of the hub wheel 1, thereby constructing the recess-projection fitting structure M in which the whole of the fitting sites of the projections 35 and the recesses 36 is in close contact. The fitting site 38 of the projection 35 and the recess 36 is a range A shown in FIG. 13b. In the projection 35, the other area is an area B that is not fitted in the recess 36. Gaps 62 are each formed on the outer diameter side from the outer circumferential surface of the shaft portion 12 and between the adjacent projections 35 in the circumferential direction.

Figure 14:
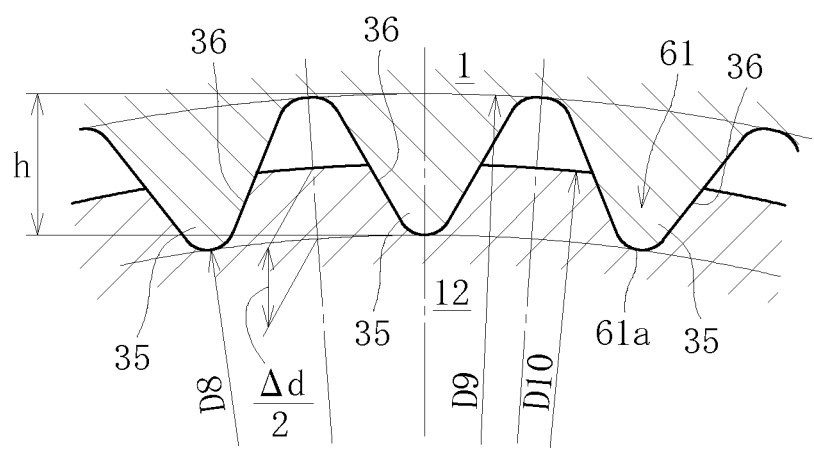

As shown in FIG. 14, the intermediate portion in the height direction of the projection 35 corresponds to a position of the outer diameter surface of the shaft portion 12 before the recess formation. That is, an outer diameter dimension D10 of the shaft portion 12 is set to be larger than a minimum inner diameter dimension D8 of the projections 35 of the female splines 61 (a diameter dimension of a circumscribed circle passing tooth tips 61a of the female splines 61), and smaller than a maximum inner diameter dimension D9 of the female splines 61 (a diameter dimension of a circular orbit connecting tooth bottoms 61b of the female splines 61) (D8<D10<D9). Moreover, if the press fitting margin of the projection 35 to the shaft portion 12 is Δd and the height of the projections 35 is h, Δd/2 h is set to a range of 0.3<Δd/2 h<0.86. The press fitting margin Δd at this time is represented by a diameter difference (D10−D8) between the outer diameter dimension D10 of the shaft portion 12 and the minimum inner diameter dimension D8 of the projections 35. This allows the vicinity of the intermediate portion in the height direction of the projections 35 to dig into the outer diameter surface of the shaft portion 12, and thus, the press fitting margin of the projections 35 can be sufficiently assured, and the recesses 36 can be surely formed.

Figure 13B:
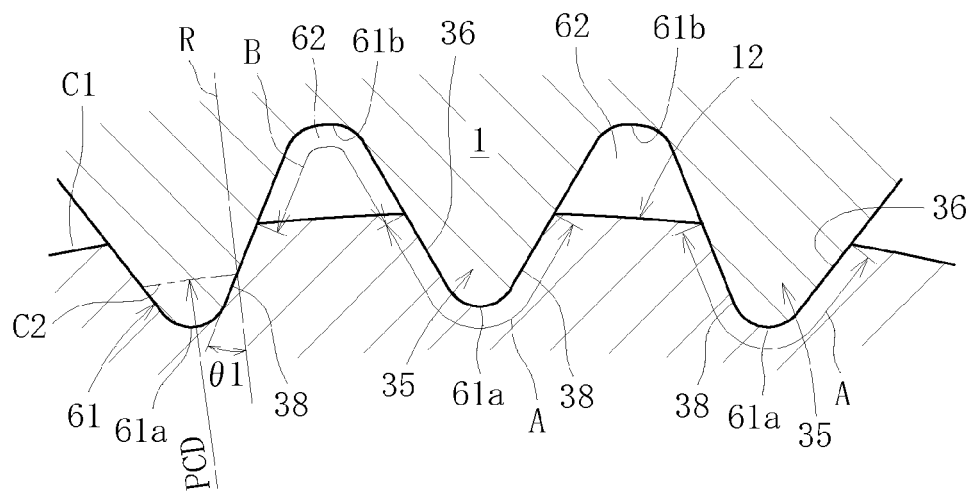

In this recess-projection fitting structure M as well, as shown in FIG. 13b, in the projection 35, the pitch circle is the circle C2 passing a middle point of a distance from the circle C1 passing a border portion between the area where each of the projections 35 is fitted in each of the recesses 36 and the area where each of the projections 35 is not fitted in each of the recesses 36 to each of the tooth tips 61a of the projections 35, and on this pitch circle, the angle θ1 formed between the diameter direction line and the side surface of the projection is set to satisfy 0°≤θ1≤45°. Moreover, if the diameter of the pitch circle C2 of the projections 35 is PCD, and the number of the projections 35 is Z, 0.30≤PCD/Z≤1.0 is set.

In this constitution as well, since the sticking-out portion 45 is formed by the press fitting, the pocket portion 46 to store this sticking-out portion 45 is preferably provided. In this constitution, since the sticking-out portion 45 is formed on the inboard side of the shaft portion 12, the pocket portion 46 is provided on the inboard side from the recess-projection fitting structure M and on the side of the hub wheel 1 (illustration is omitted).

In this manner, in the case where the projections 35 of the recess-projection fitting structure M are provided in the inner diameter surface of the hole portion 22 of the hub wheel 1, the thermal hardening treatment of the shaft portion 12 is not required, and thus, an advantage of high productivity of the joint outer ring 5 of the constant velocity universal joint 3 can be attained.

While the embodiments of the present invention have been described, the present invention is not limited to the above-described embodiments, but various modifications can be made. For example, as a cross-sectional shape of each of the projections 35 of the recess-projection fitting structure M, beside the shapes shown in FIGS. 2a, 2b, 3a to 3c, and 12a and 12b, the projection 35 having various cross-sectional shapes such as a semicircular shape, a semielliptical shape, a rectangular shape and the like can be employed, and an area, the number, disposition pitch in the circumferential direction and the like of the projections 35 can be arbitrarily changed. The projections 35 can also be formed of a key or the like separate from the shaft portion 12 and the hub wheel 1.

Moreover, as the hole portion 22 of the hub wheel 1, an odd-shaped hole such as a polygonal hole other than a circular hole may be employed, and a cross-sectional shape of the end surface of the shaft portion 12 to be fitted and inserted into this hole portion 22 may be an odd-shaped cross section such as a polygonal cross section other than a circular cross section. Furthermore, when press-fitting the shaft portion 12 into the hub wheel 1, the hardness of the projections 35 in at least an end portion area including the end surface on the press fitting start side only needs to be higher than the hardness on the press-fitted side, and the hardness of all the projections 35 need not be high. In FIGS. 2b and 13b, while the gaps 40 and 62 are formed between the tooth bottoms of the splines having the projections 35, and the member where the recesses 36 are formed, respectively, the entire groove between the projections 35 may be filled with the counterpart member.

Moreover, although the illustration is omitted, in a recess formed surface of the member where the recesses are formed, small recesses disposed at a predetermined pitch along the circumferential direction may be provided beforehand. Each of the small recesses needs to have a smaller volume than that of the recess 36. The provision of the above-described small recesses can reduce the volume of the sticking-out portion 45 formed at the time of press fitting of the projections 35, thereby reducing press fitting resistance. Moreover, since the sticking-out portion 45 can be lessened, the volume of the pocket portion 46 can be made smaller, which can enhance workability of the pocket portion 46 and strength of the shaft portion 12. As a shape of each of the small recesses, various shapes such as triangle, semielliptical, rectangular shapes and the like can be employed, and a number thereof can be arbitrarily set.

Moreover, as the rolling elements 30 of the wheel bearing 2, skids other than the balls can be used. Furthermore, in the constant velocity universal joint 3, the joint inner ring 6 and the shaft 10 may be integrated through the above-described recess-projection fitting structure M.

Moreover, while in the above-described embodiments, the present invention is applied to the wheel bearing device of the third generation, the present invention can be similarly applied to wheel bearing devices of the first, second and fourth generations.

DESCRIPTION OF REFERENCE SIGNS

1: hub wheel
2: wheel bearing
3: constant velocity universal joint
5: joint outer ring
11: mouse portion
12: shaft portion
13: bolt hole
22: hole portion
22a: shaft portion fitting hole
22d: inner wall
26, 27: outer raceway surface (outer race)
28, 29: inner raceway surface (inner race)
31: caulking portion
35: projection
36: recess
38: fitting site
44: guide groove
45: sticking-out portion
46: pocket portion
50: bolt member
50a: head portion
50b: screw shaft portion
50b1: base portion
50b2: screw portion
d1: seating surface outer diameter
d2: shaft diameter
M: recess-projection fitting structure
M1: guide portion
S: seal material

The invention claimed is:
1. A wheel bearing device comprising:
a wheel bearing including:
an outer member having double-row outer raceway surfaces in an inner circumference;
an inner member including a hub wheel to be mounted to a wheel and having double-row inner raceway surfaces, which opposed to the double-row outer raceway surfaces of the outer member, in an outer circumference; and
double-row rolling elements intervening between the double-row outer raceway surfaces of the outer member and the double-row inner raceway surfaces of the inner member,
wherein the hub wheel has a hole portion, an inner wall, and an end portion, the inner wall protruding in an inner diameter direction and having a cylindrical inner circumferential surface, and the end portion being toward an inboard side of the hub wheel and being caulked to form a caulking portion, the caulking portion precompressing the wheel bearing;
a bolt member; and
a constant velocity universal joint having an outer joint member including a shaft portion with a bolt hole, wherein
one of the shaft portion of the outer joint member and the hole portion of the hub wheel has projections extending in an axial direction that are press-fitted into another of the shaft portion of the outer joint member and the hole portion of the hub wheel to form recesses therein by the projections, the recesses and the projections forming a recess-projection fitting structure where an entire area of fitting sites of the projections and the recesses is brought into close contact, the bolt member is screwed into the bolt hole and fastens the hub wheel to the outer joint member via the inner wall of the hub wheel, when the bolt member is detached, a drawing force applied in the axial direction separates the recess-projection fitting structure, if a seating surface outer diameter of the bolt member is d1, a shaft diameter of the bolt member is d2, and an inner diameter size of the inner wall of the hub wheel is d3, the bolt member satisfies relational expressions of $2.3 \leq (d1/d2)^2 \leq 4.9$ and $0.05 \text{ mm} < d3-d2 < 0.5 \text{ mm}$, and an end surface of the caulking portion and an end surface of the outer joint member, which are opposed to each other, are in contact while an end surface of the shaft portion of the outer joint member and an end surface of the inner wall of the hub wheel, which are opposed to each other, are free from contact, and the hub wheel is sandwiched between the bolt member and the outer joint member in the axial direction.

2. The wheel bearing device according to claim 1, wherein the shaft portion of the outer joint member has the projections, and a hardness of at least an end portion on a press fitting start side of the projections is higher than that of an inner diameter portion of the hole portion of the hub wheel.

3. The wheel bearing device according to claim 2, wherein the shaft portion of the outer joint member has the projections, and a pocket portion that stores a sticking-out portion produced by the formation of the recesses by the press fitting of the projections is provided.

4. The wheel bearing device according to claim 1, wherein the shaft portion of the outer joint member has the projections, and a pocket portion that stores a sticking-out portion produced by the formation of the recesses by the press fitting of the projections is provided.

5. The wheel bearing device according to claim 1, wherein the hole portion of the hub wheel has the projections, and a hardness of at least an end portion on a press fitting start side of each of the projections is higher than that of an outer diameter of the shaft portion of the outer joint member.

6. The wheel bearing device according to claim 5, wherein the hole portion of the hub wheel has the projections, and a pocket portion that stores a sticking-out portion produced by the formation of the recesses by the press fitting of the projections is provided.

7. The wheel bearing device according to claim 1, wherein the hole portion of the hub wheel has the projections, and a pocket portion that stores a sticking-out portion produced by the formation of the recesses by the press fitting of the projections is provided.

8. The wheel bearing device according to claim 1, wherein the projections are provided at a plurality of positions in a circumferential direction, and in an intermediate portion in a height direction of each of the projections, a thickness in the circumferential direction of each of the projections is smaller than a groove width between adjacent pairs of the projections.

9. The wheel bearing device according to claim 1, wherein the projections are provided at a plurality of positions in a circumferential direction, and in an intermediate portion in a height direction of each of the projections, a summation of thicknesses in the circumferential direction of the projections is smaller than a summation of groove widths between adjacent pairs of the projections.

10. The wheel bearing device according to claim 1, wherein the inner member includes the hub wheel, and an inner ring press-fitted on an outer circumference of the end portion on the inboard side of the hub wheel, and an inner raceway surface of the double-row inner raceway surfaces on an outboard side is formed on an outer circumferential surface of the hub wheel and an inner raceway surface of the double-row inner raceway surfaces on the inboard side is formed on an outer circumferential surface of the inner ring.

11. The wheel bearing device according to claim 1, wherein the other of the shaft portion of the outer joint member and the hole portion of the hub wheel has a guide portion to guide the press fitting of the projections provided at an end portion on a press fitting start side of the other of the shaft portion of the outer joint member and the hole portion of the hub wheel.

12. The wheel bearing device according to claim 1, further comprising a seal material intervening between a seating surface of the bolt member and the hub wheel.

\* \* \* \* \*